United States Patent
Kohiga et al.

(10) Patent No.: US 11,548,529 B2
(45) Date of Patent: Jan. 10, 2023

(54) CONTROL METHOD, CONTROL DEVICE, AND RECORDING MEDIUM

(71) Applicant: NEC CORPORATION, Tokyo (JP)

(72) Inventors: Akihito Kohiga, Tokyo (JP); Yasuhiko Tanabe, Tokyo (JP); Masataka Matoba, Tokyo (JP); Yuichi Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 28 days.

(21) Appl. No.: 16/830,969

(22) Filed: Mar. 26, 2020

(65) Prior Publication Data

US 2020/0307629 A1 Oct. 1, 2020

(30) Foreign Application Priority Data

Mar. 28, 2019 (JP) .............................. JP2019-063090

(51) Int. Cl.
  *G05D 1/02* (2020.01)
  *B60W 60/00* (2020.01)
  *G01C 21/34* (2006.01)
  *G06V 20/58* (2022.01)

(52) U.S. Cl.
  CPC .... *B60W 60/0011* (2020.02); *B60W 60/0021* (2020.02); *G01C 21/3461* (2013.01); *G05D 1/0238* (2013.01); *G06V 20/58* (2022.01); *B60W 2554/00* (2020.02); *G05D 2201/0216* (2013.01)

(58) Field of Classification Search
  None
  See application file for complete search history.

(56) References Cited

U.S. PATENT DOCUMENTS

| | | | | |
|---|---|---|---|---|
| 4,564,917 A * | 1/1986 | Yamada | ................... | G09G 3/04 324/160 |
| 9,852,345 B2 * | 12/2017 | Iwai | ................... | G06K 9/00771 |
| 2006/0116815 A1 * | 6/2006 | Nomura | ............ | G01C 21/3484 701/417 |
| 2006/0265126 A1 * | 11/2006 | Olcott | ................... | B60K 35/00 701/400 |
| 2009/0183403 A1 * | 7/2009 | Wright | ..................... | G09G 3/16 40/444 |
| 2014/0277691 A1 * | 9/2014 | Jacobus | .................. | B66F 9/063 700/216 |
| 2016/0342850 A1 * | 11/2016 | Elimalech | ................. | B60R 1/00 |

(Continued)

FOREIGN PATENT DOCUMENTS

| | | |
|---|---|---|
| JP | 2006-107475 A | 4/2006 |
| JP | 2009-116455 A | 5/2009 |

(Continued)

OTHER PUBLICATIONS

Office Action dated May 13, 2020 in Japanese Application No. 2019-063090.

*Primary Examiner* — James J Lee
*Assistant Examiner* — Tawri M Matsushige

(57) ABSTRACT

A control device controlling the movement route of a transportation vehicle calculates a movement route to a target position of the transportation vehicle and, in a case where an obstacle exists on the calculated movement route, counts the number of detours indicating the magnitude of an influence of the obstacle on movement route calculation, and calculates the movement route again so as to avoid the obstacle.

8 Claims, 21 Drawing Sheets

(56) References Cited

U.S. PATENT DOCUMENTS

| | | | | |
|---|---|---|---|---|
| 2017/0357270 A1* | 12/2017 | Russell | ............... | G05D 1/0242 |
| 2019/0155275 A1* | 5/2019 | Akamatsu | ............ | G05D 1/0276 |
| 2019/0240834 A1* | 8/2019 | Yi | ........................ | B25J 9/1664 |
| 2019/0302796 A1* | 10/2019 | Watanabe | ............ | A47L 11/4061 |
| 2020/0053324 A1* | 2/2020 | Deyle | .................... | G01C 21/20 |
| 2020/0097022 A1* | 3/2020 | Miki | .................... | G05D 1/0212 |
| 2020/0150655 A1* | 5/2020 | Artes | ................... | G05D 1/0016 |

FOREIGN PATENT DOCUMENTS

| | | |
|---|---|---|
| JP | 2011-150540 A | 8/2011 |
| KR | 10-2006-0031058 A | 4/2006 |

\* cited by examiner

CONTROL SYSTEM 100

Fig.6 BECAUSE OBSTACLE HAS ALREADY BEEN FOUND, ROUTE IS CALCULATED SO AS TO AVOID OBSTACLE.
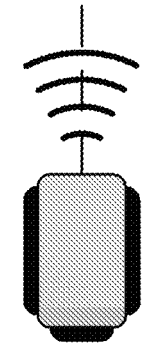
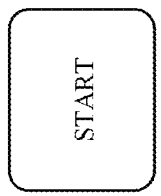
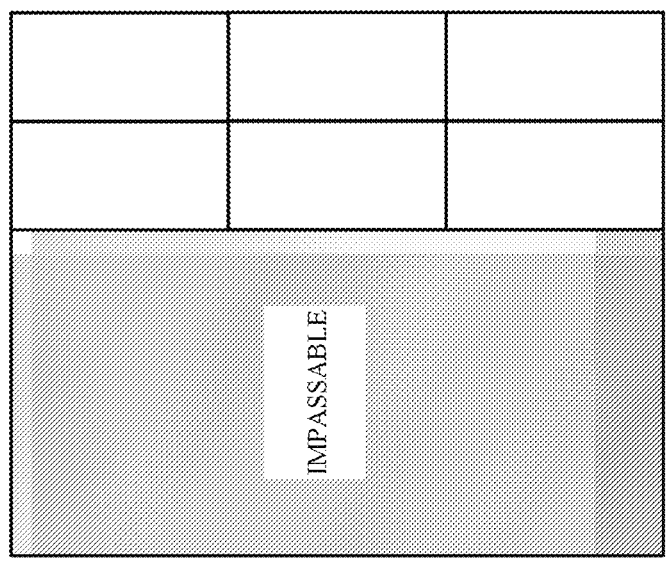
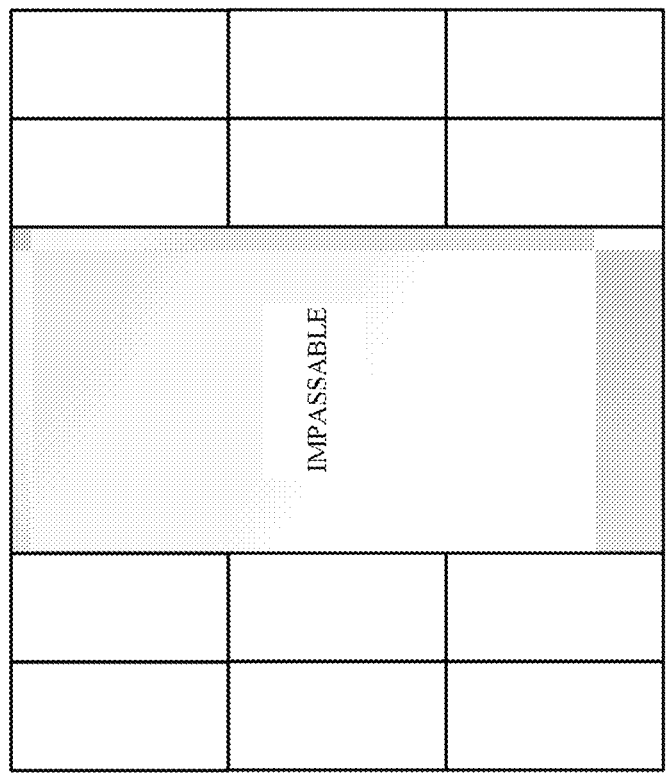
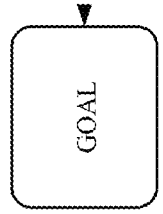

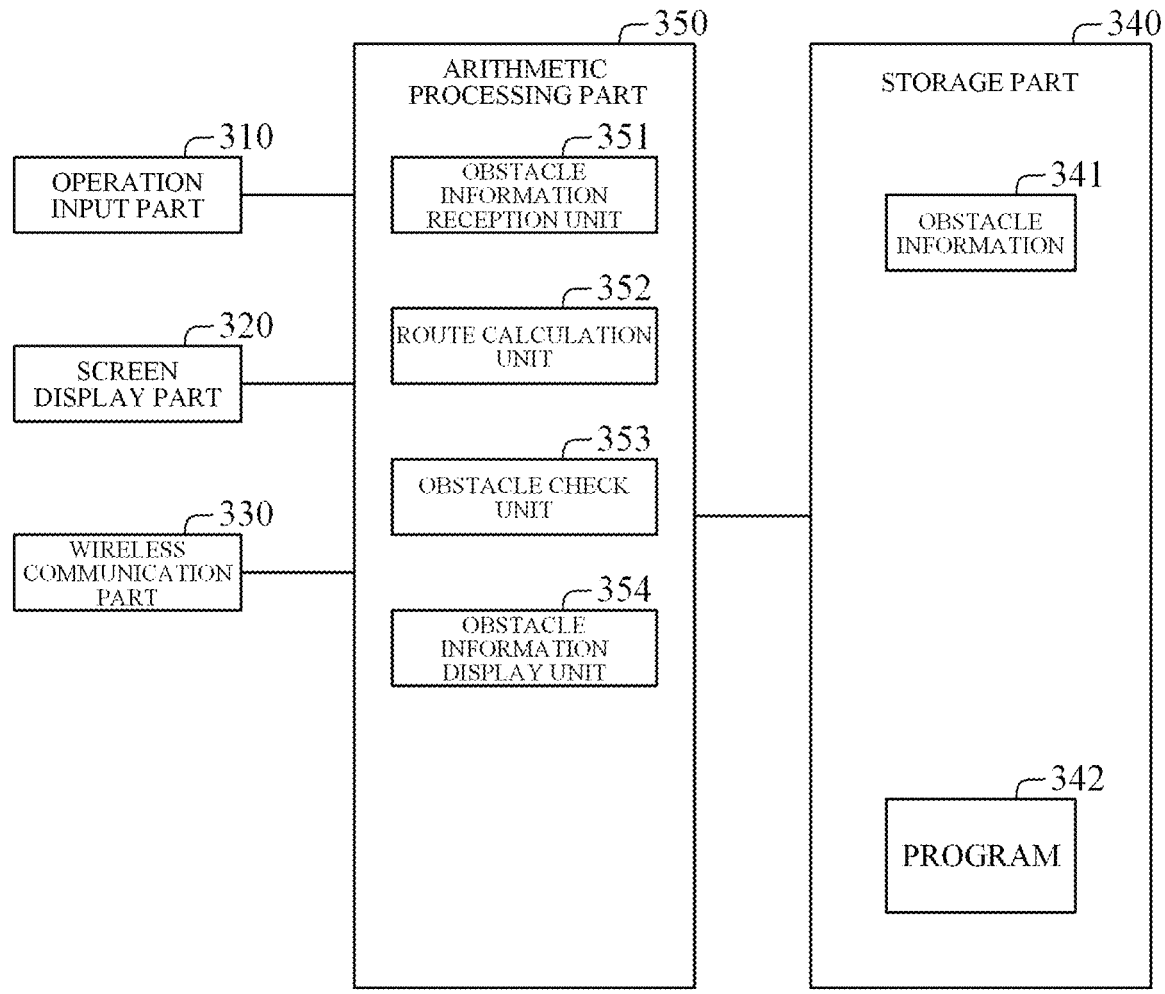

1. CALCULATE COST OF START POINT

- ACTUAL COST(C) = 0
- ESTIMATED COST(H) = 5
- SCORE(S) = 0 + 5 = 5

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

2. CALCULATE SCORES OF PERIPHERAL NODES

·SIMULTANEOUSLY, GENERATE LINKS TO
START NODE AS PARENT NODE OF NODES
NODE(1,0) -> START
NODE(0,1) -> START
NODE(1,2) -> START

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

3. CLOSE START NODE SERVING AS REFERENCE NODE

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

4. SELECT REFERENCE NODE

| MARK | NAME | CONTENT |
|------|------|---------|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

5. CALCULATE SCORES OF PERIPHERAL NODES

• SIMULTANEOUSLY, GENERATE LINKS TO START NODE AS PARENT NODE OF NODES NODE(0,2) -> NODE(1,2)

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

6. CLOSE REFERENCE NODE

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

7. SELECT REFERENCE NODE

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

8. CALCULATE SCORES OF PERIPHERAL NODES

· SIMULTANEOUSLY, GENERATE LINKS TO START NODE AS PARENT NODE OF NODES
NODE(0,0) -> NODE(1,0)
NODE(0,0) -> NODE(1,0)

| Mark | Name | Content |
|---|---|---|
| C | Actual Cost | COST OF MOVEMENT FROM START |
| H | Estimated Cost | COST OF MOVEMENT TO GOAL (ESTIMATED) |
| S | Score | ACTUAL COST + ESTIMATED COST |

9. CLOSE REFERENCE NODE

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

10. SELECT REFERENCE NODE

| MARK | NAME | CONTENT |
|---|---|---|
| C | ACTUAL COST | COST OF MOVEMENT FROM START |
| H | ESTIMATED COST | COST OF MOVEMENT TO GOAL (ESTIMATED) |
| S | SCORE | ACTUAL COST + ESTIMATED COST |

• WHEN REPEATING PROCESS AND REACHING GOAL, ROUTE IS COMPLETED BY TRACKING BACK LINKS

GOAL <- NODE(3,3) <- NODE(3,2) <- NODE(3,1) <- NODE(3,0) <- NODE(2,0) <- NODE(1,0) <- START

CONTROL METHOD, CONTROL DEVICE, AND RECORDING MEDIUM

INCORPORATION BY REFERENCE

This application is based upon and claims the benefit of priority from Japanese patent application No. 2019-063090, filed on Mar. 28, 2019, the disclosure of which is incorporated herein in its entirety by reference.

TECHNICAL FIELD

The present invention relates to a control method, a control device, and a recording medium.

BACKGROUND ART

There is a case where an item such as a product stored in a warehouse or the like is transported by a transportation vehicle which automatically travels.

Such a transportation vehicle may travel based on a calculated movement route. An example of a technique used in calculation of a movement route to travel is described in, for example, Patent Document 1. Patent Document 1 describes a mobile robot which includes a self-position measurement device, a map database, an obstacle information extraction part, and a route calculation device. According to Patent Document 1, the obstacle information extraction part extracts obstacle information in a detection area of a virtual sensor based on self-position information measured by the self-position measurement device and map information stored in the map database. The virtual sensor is set on the map information and is able to detect obstacle information of an obstacle to the movement of the main body. The route calculation device then calculates a movement route on which the main body moves, based on the obstacle information extracted by the obstacle information extraction part.

Patent Document 1: Japanese Unexamined Patent Application Publication No. JP-A 2006-107475

The influence of an obstacle is thought to be greater as the number of times that the obstacle exists on the movement route of a transportation vehicle and obstructs its travel increases. However, in a case where the technique as described in Patent Document 1 is used, a movement route is calculated so as to avoid an obstacle until the obstacle is eliminated. As a result, an obstacle does not hinder travel of a transportation vehicle, and a problem occurs that it is impossible to grasp the influence of the obstacle.

SUMMARY OF THE INVENTION

Accordingly, an object of the present invention is to provide a control method, a control device, and a recording medium which solve a problem that it is difficult to grasp the influence of an obstacle when calculating a movement route so as to avoid the obstacle.

In order to achieve the object, a control method according to an aspect of the present invention is a control method by a control device controlling a movement route of a transportation vehicle. The control method includes: calculating a movement route to a target position of the transportation vehicle; and in a case where an obstacle exists on the calculated movement route, counting a number of detours indicating magnitude of an influence of the obstacle on movement route calculation, and calculating the movement route again so as to avoid the obstacle.

Further, a control device according to another aspect of the present invention is a control device controlling a movement route of a transportation vehicle. The control device includes a route calculation unit configured to calculate a movement route to a target position of the transportation vehicle. In a case where an obstacle exists on the calculated movement route, a counting unit counts a number of detours indicating magnitude of an influence of the obstacle on movement route calculation, and the route calculation unit calculates the movement route again so as to avoid the obstacle.

Further, a recording medium according to another aspect of the present invention is a non-transitory computer-readable medium storing a program. The program includes instructions for causing a control device controlling a movement route of a transportation vehicle to realize a route calculation unit configured to calculate a movement route to a target position of the transportation vehicle. In a case where an obstacle exists on the calculated movement route, a counting unit counts a number of detours indicating magnitude of an influence of the obstacle on movement route calculation, and the route calculation unit calculates the movement route again so as to avoid the obstacle.

With the configurations as described above, the present invention can provide a control method, a control device, and a recording medium which allow for grasp of the influence of an obstacle when calculating a movement route so as to avoid the obstacle.

BRIEF DESCRIPTION OF DRAWINGS

FIG. 6 is a view showing the example of the operation of the AGV;

FIG. 7 is a block diagram showing an example of the configuration of an AGV control device shown in FIG. 1;

FIG. 8 is a view showing an example of obstacle information shown in FIG. 7;

EXAMPLE EMBODIMENT

First Example Embodiment

Figure 1:
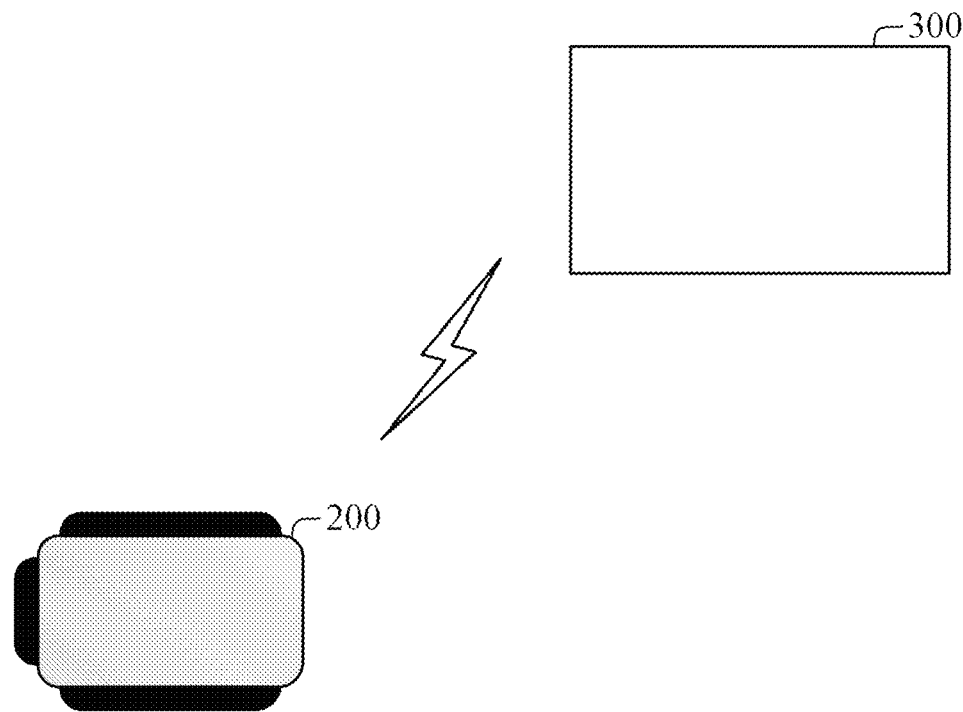
FIG. 1 is a view showing an example of the overall configuration of a control system in a first example embodiment of the present invention.
Figure 2:
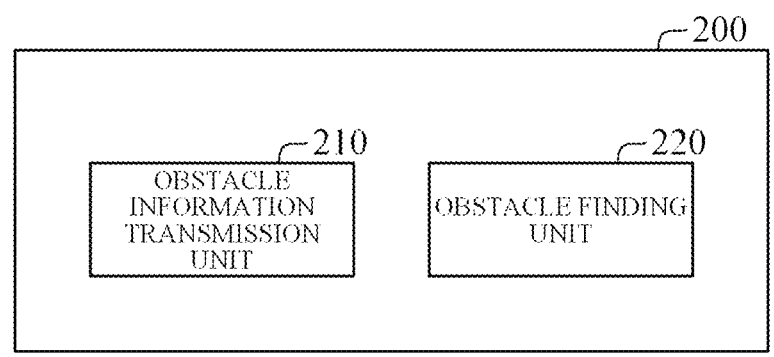
FIG. 2 is a block diagram showing an example of the configuration of an AGV (Automated Guided Vehicle) shown in FIG. 1.
Figure 3:
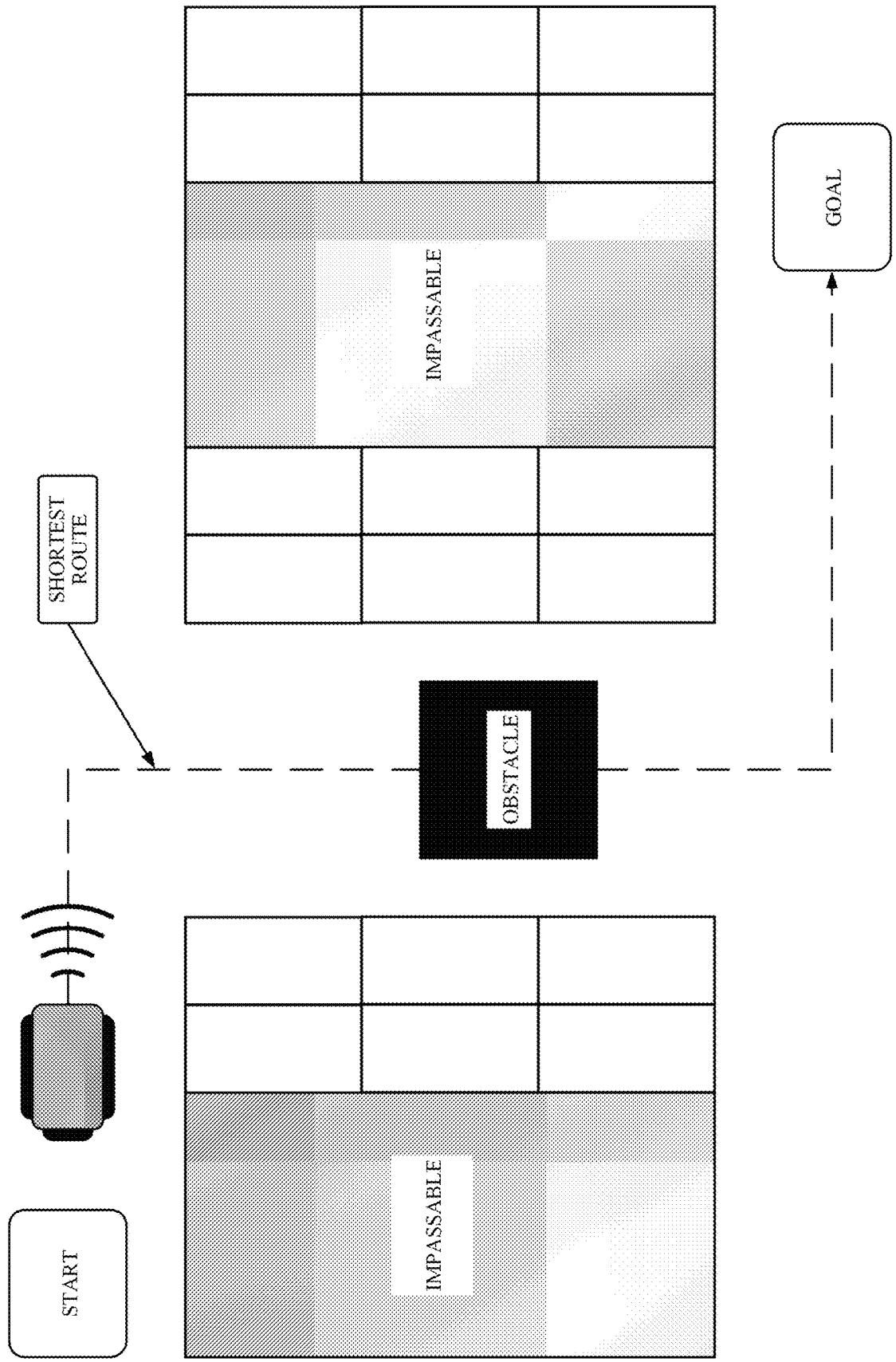
FIG. 3 is a view showing an example of the operation of the AGV.
Figure 19:
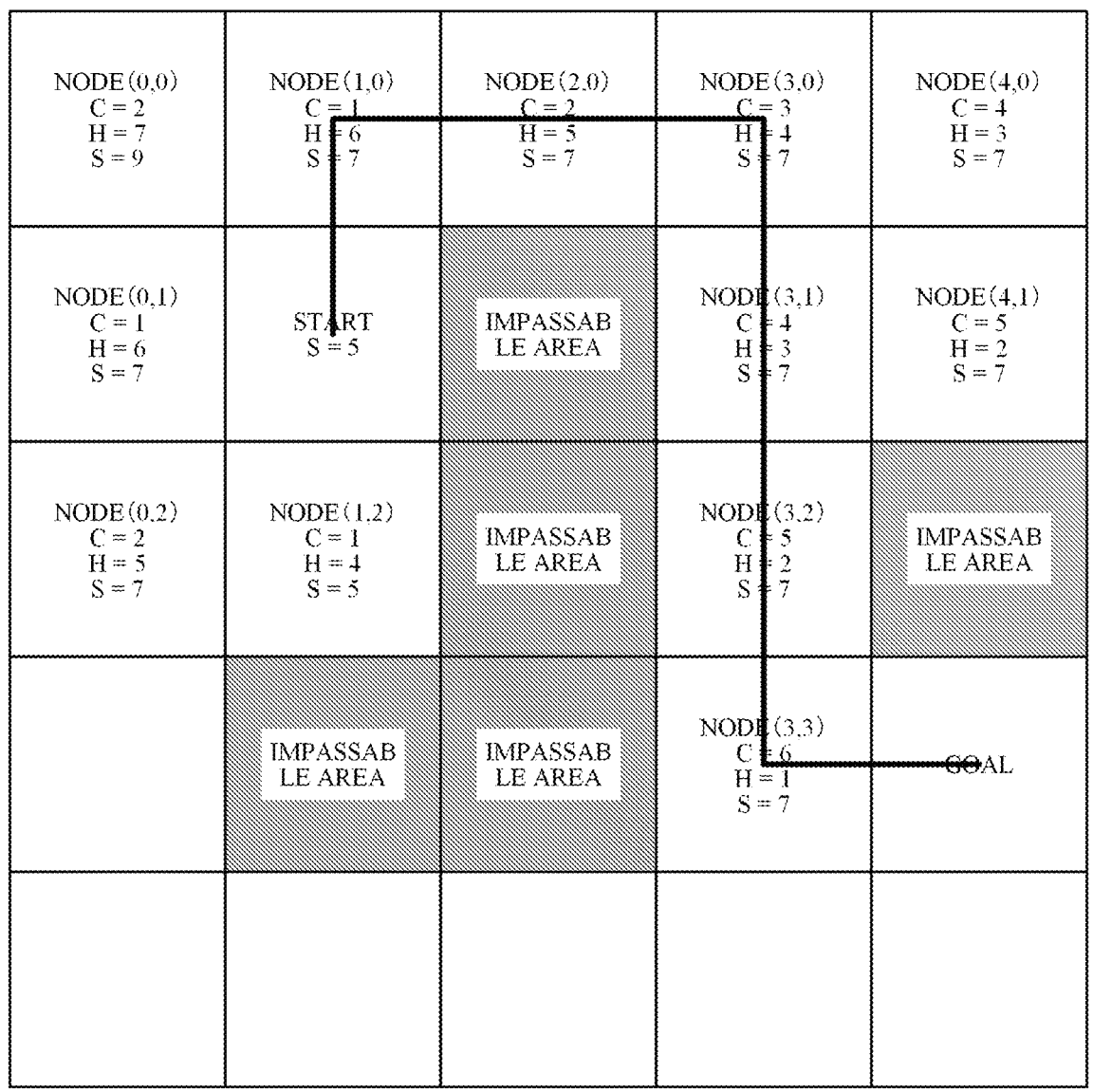
FIG. 19 is a view for describing the example of the process that the route calculation unit shown in FIG. 7 calculates a movement route.
Figure 20:
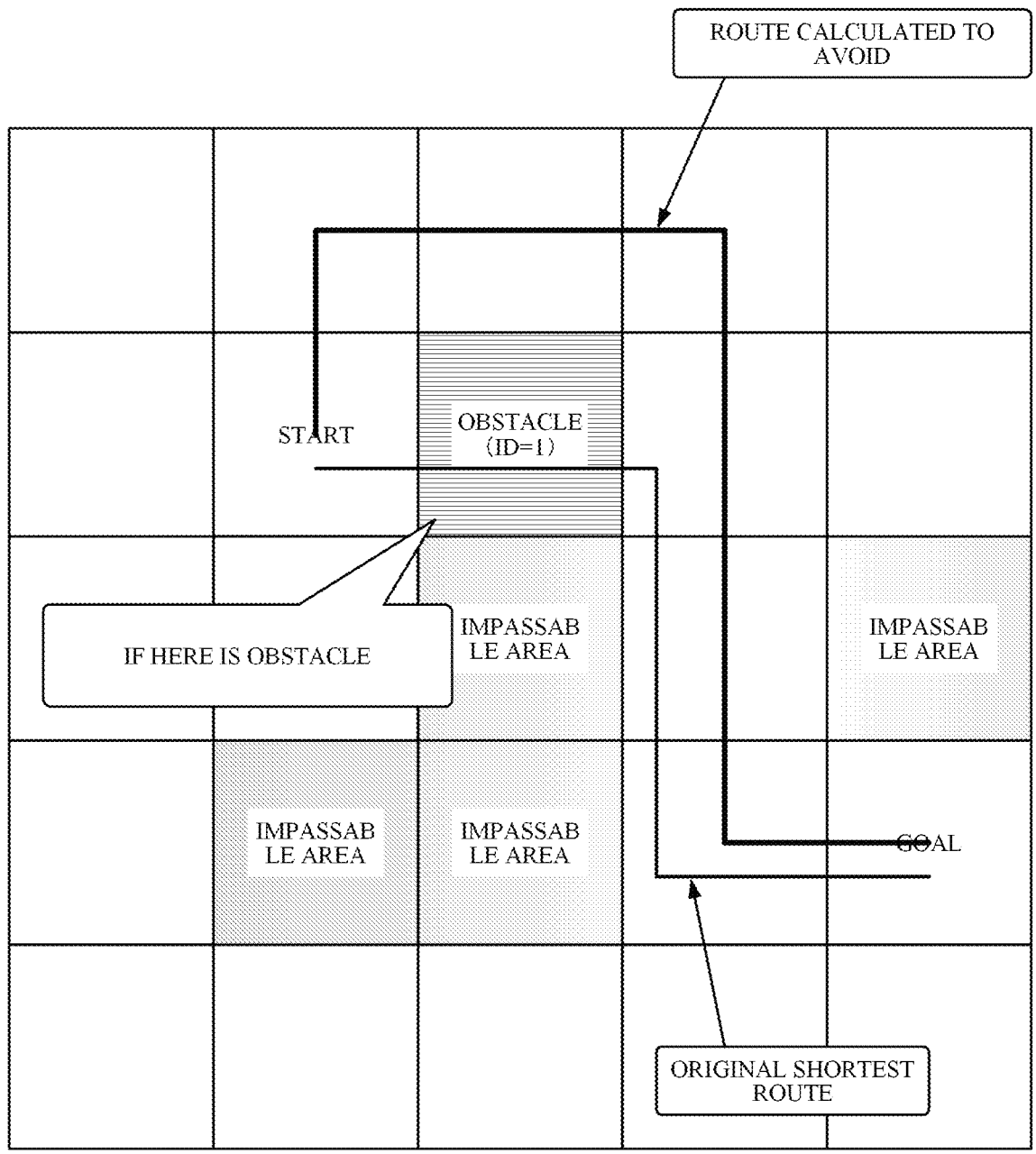
FIG. 20 is a view for describing the example of the process that the route calculation unit shown in FIG. 7 calculates a movement route.
Figure 21:
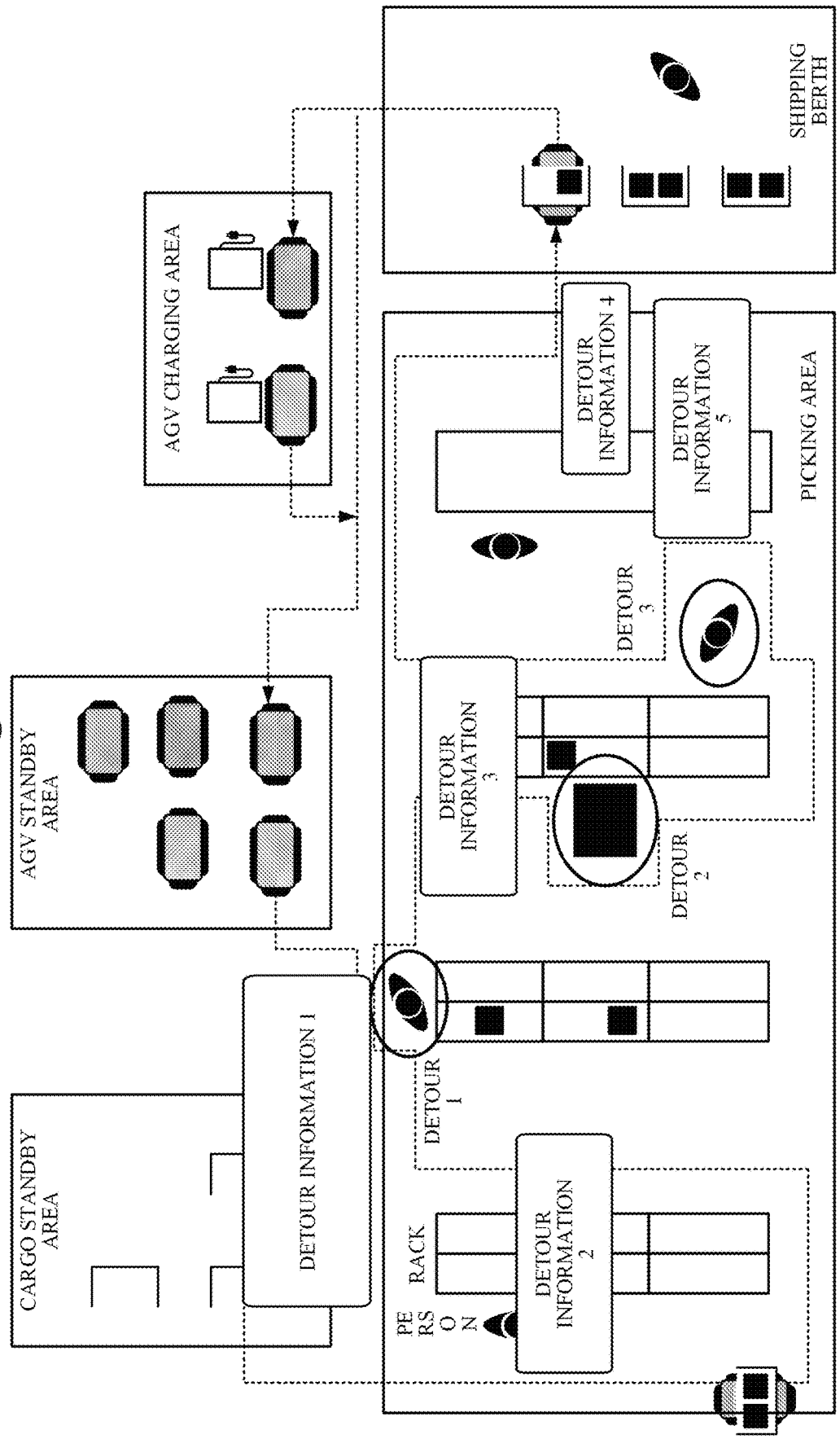
FIG. 21 is a view showing an example of information displayed on a screen display part.
Figure 22:
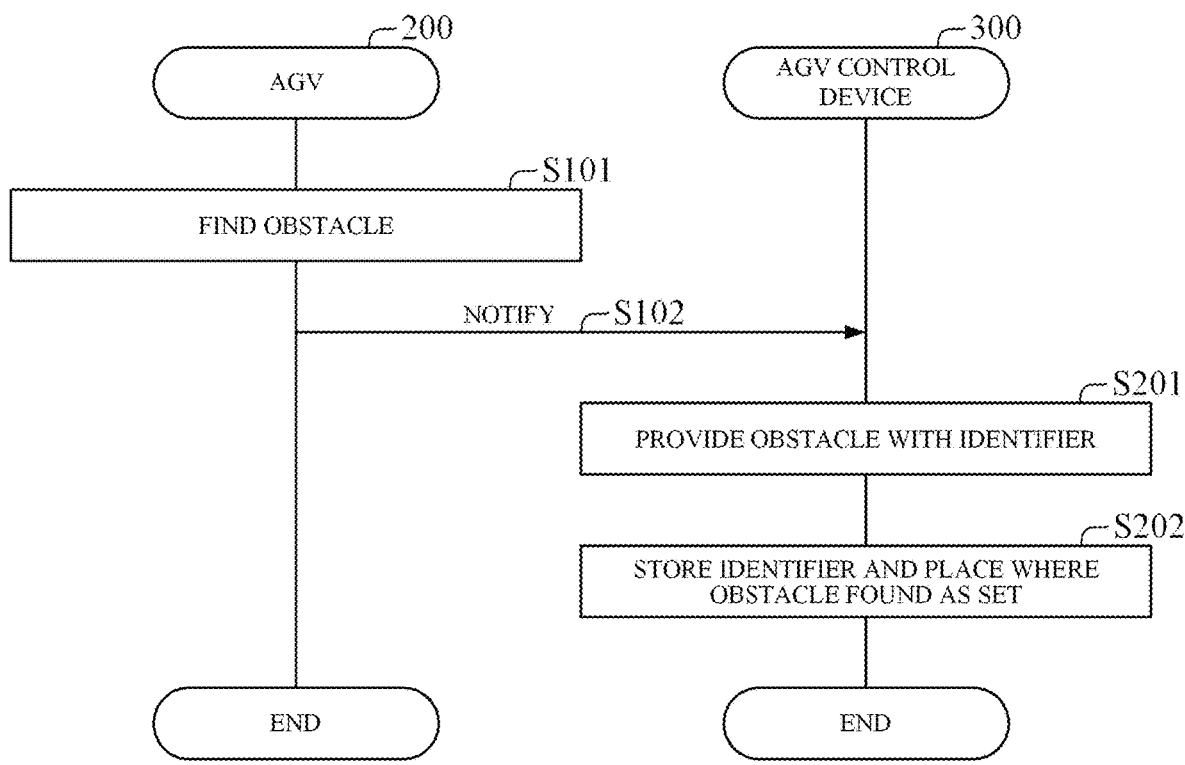
FIG. 22 is a sequence diagram showing an example of a process executed when an obstacle is found.
Figure 23:
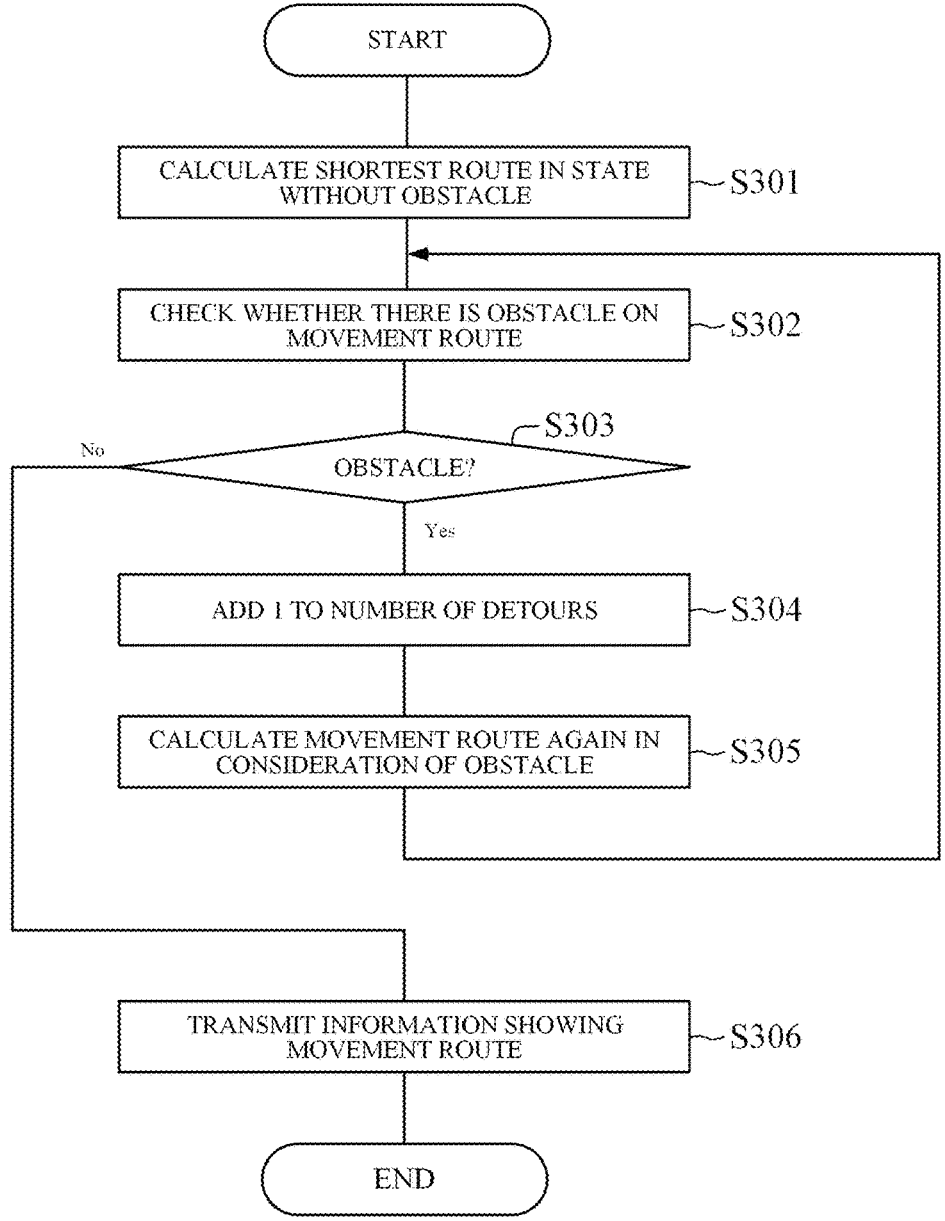
FIG. 23 is a flowchart showing an example of a process executed in calculation of a movement route.

A first example embodiment of the present invention will be described referring to FIGS. 1 to 23. FIG. 1 is a view showing an example of the overall configuration of a control system 100. FIG. 2 is a block diagram showing an example of a configuration characteristic to this example embodiment of an AGV (Automated Guided Vehicle) 200. FIGS. 3 to 6 are views showing an example of the operation of the AGV. FIG. 7 is a block diagram showing an example of the configuration of an AGV control device 300. FIG. 8 is a view showing an example of obstacle information 341. FIGS. 9 to 20 are views for describing an example of a process that a route calculation unit 352 calculates a movement route. FIG. 21 is a view showing an example of information displayed on a screen display part 320. FIG. 22 is a sequence diagram showing an example of a process executed when an obstacle is found. FIG. 23 is a flowchart showing an example of a process executed in calculation of a movement route.

In the first example embodiment of the present invention, the control system 100 that includes the AGV control device 300 calculating the movement route of the AGV 200 that is an unmanned transportation vehicle will be described. As will be described later, the AGV control device 300 described in this example embodiment calculates a movement route which is the shortest in a state without considering the existence of an obstacle. Moreover, the AGV control device 300 checks whether or not an obstacle exists on the calculated movement route based on the obstacle information 341. Then, in a case where an obstacle exists on the calculated movement route, the AGV control device 300 adds 1 to the number of detours of the obstacle existing on the movement route, and calculates a movement route again by regarding a place where the obstacle exists as an impassable area. After repeating the abovementioned process as needed, the AGV control device 300 transmits information representing a movement route on which no obstacle exists to the AGV 200.

In the control system 100 described in this example embodiment, the AGV 200 moves along a movement route calculated by the AGV control device 300. Moreover, in the control system 100, an obstacle is found by the AGV 200. Herein, an obstacle in this example embodiment is what hinders the movement of the AGV 200. For example, an obstacle may be a stationary object such as an item fallen on the floor, or may be a moving object such as a worker who performs picking. An obstacle may be other than exemplified.

FIG. 1 shows an example of the overall configuration of the control system 100. Referring to FIG. 1, the control system 100 includes the AGV 200 and the AGV control device 300. As shown in FIG. 1, the AGV 200 and the AGV control device 300 are connected so as to be able to communicate with each other by wireless communication.

The configuration of the control system 100 is not limited to the configuration exemplified in FIG. 1. For example, the control system 100 can include any number of AGVs 200. Moreover, the AGV control device 300 may be configured by one information processing device, or may be configured by multiple information processing devices.

The AGV 200 estimates the self-position by using various sensors or the like, and receives information representing a movement route from the AGV control device 300 to move along the received movement route. The AGV 200 also detects an obstacle which exists on the movement route. Then, the AGV 200 discontinues movement and stops, and also transmits a fact that it has detected the obstacle to the AGV control device 300. After that, the AGV 200 receives information representing a movement route calculated again in consideration of the obstacle from the AGV control device 300, and thereby restarts movement. As the sensors for estimating the self-position, known sensors may be used such as a GPS (Global Positioning System), a gyroscope sensor, a geomagnetic sensor, an acceleration sensor, an ultrasound sensor, and a camera.

FIG. 2 shows an example of a configuration characteristic to this example embodiment of the AGV 200. Referring to FIG. 2, the AGV 200 includes, for example, an obstacle information transmission unit 210 and an obstacle finding unit 220. For example, the AGV 200 includes an arithmetic logic unit of a CPU (Central Processing Unit) or the like and a storage unit. For example, the AGV 200 realizes the above processing units by execution of a program stored in the storage device by the arithmetic login unit.

The obstacle information transmission unit 210 has an antenna part and so on. The obstacle information transmission unit 210 transmits a fact that an obstacle has been found and information representing a position where the obstacle has been found to the AGV control device 300 by wireless communication in accordance with an instruction from the obstacle finding unit 220. The obstacle information transmission unit 210 may be configured to transmit information representing a position where an obstacle has been found in accordance with an instruction from the obstacle finding unit 220.

The obstacle finding unit 220 has a sensor for finding an obstacle. The obstacle finding unit 220 uses the sensor to find an obstacle which has become close within a predetermined distance from the AGV 200. Upon finding the obstacle, the obstacle finding unit 220 instructs the obstacle information transmission unit 210 to transmit the fact that the obstacle has been found and the information representing the position where the obstacle has been found to the AGV control device 300.

As the sensor for finding an object, various sensors can be employed such as an infrared sensor, an ultrasound sensor, and a camera. As the sensor, a sensor other than exemplified above may be employed. Moreover, a distance to detect an obstacle may be properly set in accordance with the type of the sensor. The sensor for finding an obstacle may be common with or different from the sensor for estimating the self-position.

An example of the operation of the AGV 200 described in this example embodiment will be described referring to FIGS. 3 to 6. FIGS. 3 to 6 show an example of the operation of the AGV 200 when the AGV 200 moves from a start place to a target position, namely, a goal place.

As stated above, in this example embodiment, an obstacle is found by the AGV 200. Therefore, when an obstacle is not found by the AGV 200, the AGV control device 300 calculates a movement route from the start to the goal assuming there is no obstacle. Thus, in a stage before an obstacle is found, the AGV 200 receives information representing a movement route calculated by the AGV control device 300 assuming there is no obstacle. For example, in FIG. 3, the AGV 200 receives information representing a movement route indicated by dotted line that is the shortest route from the start to the goal calculated by the AGV control device 300.

Figure 4:
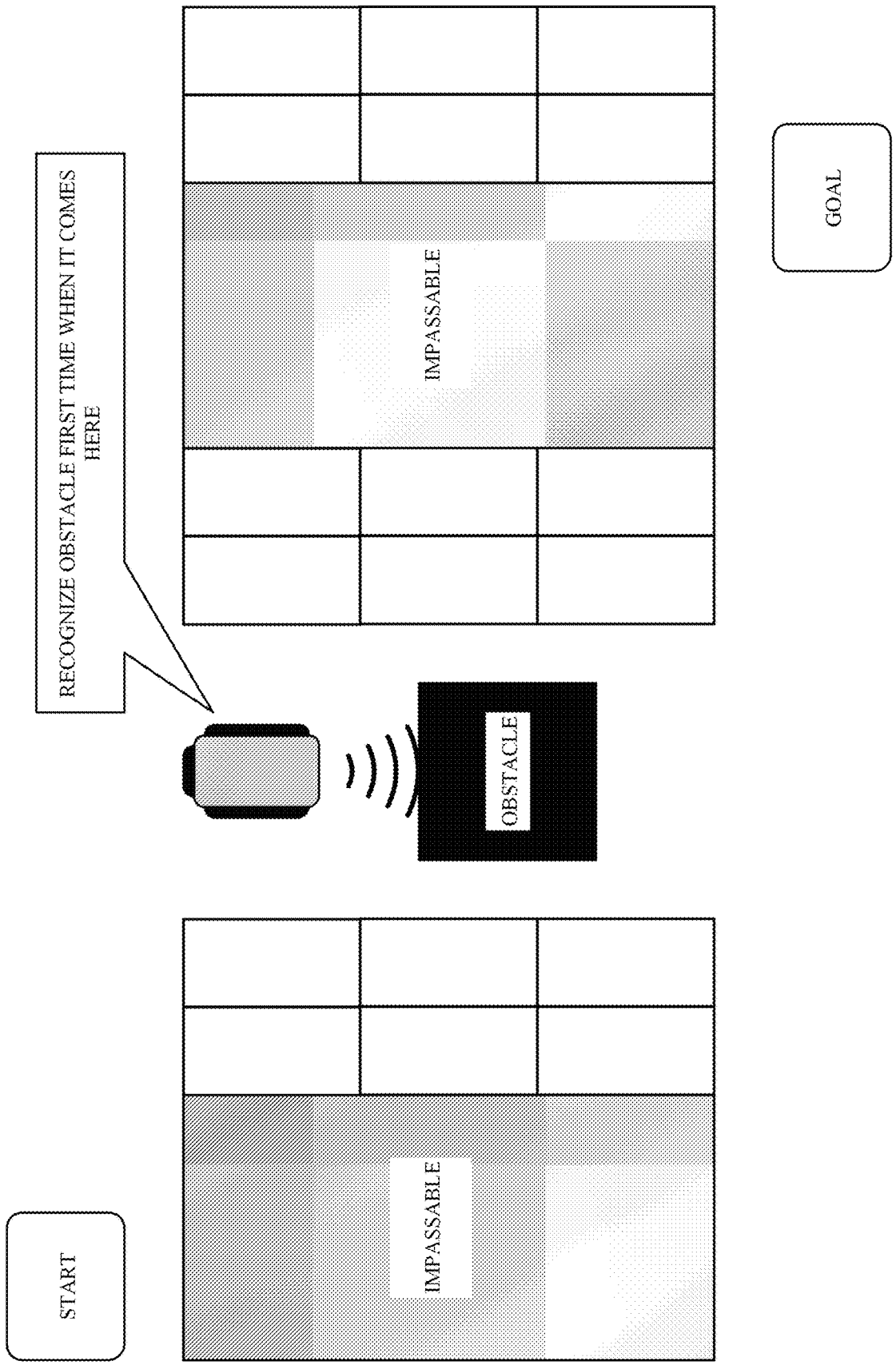
FIG. 4 is a view showing the example of the operation of the AGV.

After receiving information representing a movement route, the AGV 200 starts movement along the movement route. However, an obstacle exists on the movement route shown in FIG. 3. Therefore, as shown in FIG. 4, the AGV 200 finds an obstacle by the obstacle finding unit 220 when the distance to the obstacle becomes equal to or less than a predetermined distance. When the obstacle finding unit 220 finds an obstacle, the AGV 200 discontinues movement along the movement route and stops, and transmits a fact that an obstacle has been found and information representing a position where the obstacle has been found to the AGV control device 300.

Figure 5:
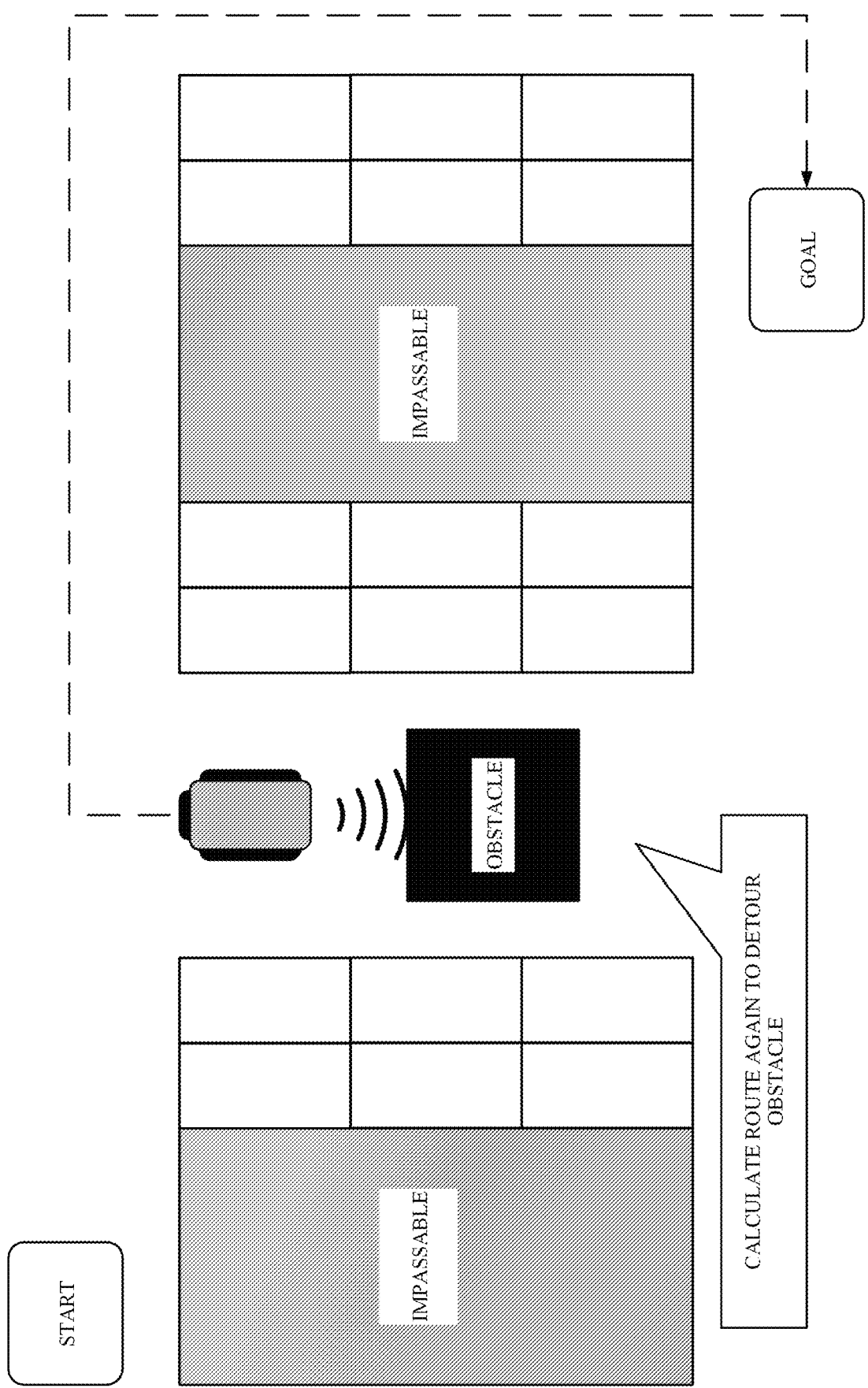
FIG. 5 is a view showing the example of the operation of the AGV.

As will be described later, upon receiving the abovementioned information transmitted by the AGV 200, the AGV control device 300 calculates a movement route in consideration of the obstacle found by the AGV 200. For example, as shown in FIG. 5, the AGV control device 300 calculates, as a movement route, a route indicated by dotted line that is the shortest route in consideration of the obstacle from the position where the AGV 200 has stopped to the goal. As a result, the AGV 200 receives information representing the movement route that is the shortest route in consideration of the obstacle shown by dotted line in FIG. 5. With this, the AGV 200 can move to the goal.

Further, as will be described later, the AGV control device 300 stores, as the obstacle information 341, a fact that an obstacle has been found and information representing a position where the obstacle has been found that are received from the AGV 200. Therefore, in the case of causing the AGV 200 to move from the start to the goal again after the AGV 200 finds an obstacle, the AGV control device 300 finally calculates a movement route considering existence of the obstacle. As a result, for example, as shown in FIG. 6, the AGV 200 receives information representing a movement route that is the shortest route in consideration of the obstacle (a movement route indicated by dotted line in FIG. 6). This enables the AGV 200 to efficiently move from the start to the goal without detecting the same obstacle and without stopping in front of the obstacle.

As described above, in a case where the AGV control device 300 recognizes the existence of an obstacle, the AGV 200 receives information representing a movement route calculated in consideration of the existence of the obstacle. Therefore, in principle, the AGV 200 does not detect the same obstacle multiple times.

The AGV control device 300 is a control device which calculates the movement route of the AGV 200 and transmits information representing the calculated movement route to the AGV 200. FIG. 7 shows an example of the configuration of the AGV control device 300. Referring to FIG. 7, the AGV control device 300 includes, for example, an operation input part 310, a screen display part 320, a wireless communication part 330, a storage part 340, and an arithmetic processing part 350, as major components.

The operation input part 310 is formed by an operation input device such as a keyboard or a mouse. The operation input part 310 detects the operation of an operator operating the AGV control device 300 and outputs to the arithmetic processing part 350.

The screen display part 320 is formed by a screen display device such as an LCD (Liquid Crystal Display). The screen display part 320 can display information corresponding to the obstacle information 341 stored by the storage part 340 on the screen in accordance with an instruction from the arithmetic processing part 350. An example of the information displayed by the screen display part 320 will be described later.

The wireless communication part 330 has an antenna part, and so on. The wireless communication part 330 transmits and receives information to and from the AGV 200 by wireless communication via the antenna part, in accordance with an instruction from the arithmetic processing part 350, or the like.

The storage part 340 is a storage device such as a hard disk or a memory. In the storage part 340, process information necessary for various processes in the arithmetic processing part 350 and a program 342 are stored. The program 342 is a program which is loaded and executed by the arithmetic processing part 350 to thereby realize various processing parts. The program 342 is previously loaded from an external device or a recording medium via a data input/output function of the AGV control device 300 and stored in the storage part 340. Major information stored in the storage part 340 is the obstacle information 341. Moreover, in the storage part 340, for example, map information representing the map of a warehouse or the like where the AGV 200 operates can be stored.

The obstacle information 341 is information representing an obstacle found by the AGV 200. FIG. 8 shows an example of the obstacle information 341. Referring to FIG. 8, in the obstacle information 341, for example, an ID that is an identifier, position information representing the position of an obstacle, and the number of detours that is a value corresponding to the number of times that a movement route for detouring the obstacle has been generated are associated. For example, ID "1", position information "(xx, yy)", and the number of detours "two times" are associated on the first row in FIG. 8. This represents that a movement route for detouring an obstacle with ID "1" located in a position indicated by position information "(xx, yy)" has been calculated two times.

Herein, an ID is identification information given to each obstacle. Although position information is exemplified with xy coordinates in FIG. 8, position information may be formed by any method other than xy coordinates as long as it can specify the position of an obstacle. Moreover, as will be described later, when an obstacle check unit 353 recognizes an obstacle on a movement route, the number of detours corresponding to the recognized obstacle is increased by 1. Thus, a movement route for detouring the obstacle is calculated more times as the number of detours is more, so that it can be said that an influence is greater. Therefore, it can also be said that the number of detours is information representing the magnitude of the influence of an obstacle on calculation of a movement route.

As will be described later, information in the obstacle information 341 is added when an obstacle information reception unit 351 receives information representing a position where an obstacle has been found. Of the obstacle information 341, the number of detours is updated by the obstacle check unit 353. Meanwhile, for example, by receiving a notification that removal of an obstacle is finished from a worker removing the obstacle, or the like, the corresponding obstacle information in the obstacle information 341 may be deleted.

The arithmetic processing part 350 is an arithmetic logic unit including a microprocessor such as an MPU (Micro Processing Unit) and a peripheral circuit thereof. The arithmetic processing part 350 loads the program 342 from the storage part 340 and executes the program 342, thereby making the abovementioned hardware and the program 342 cooperate and realizing various processing parts. Major processing parts realized by the arithmetic processing part 350 are, for example, an obstacle information reception unit 351, a route calculation unit 352, an obstacle check unit 353, and an obstacle information display unit 354.

The obstacle information reception unit 351 receives a fact that an obstacle has been found and information representing a position where the obstacle has been found, via the wireless communication part 330. Upon receiving a fact that an obstacle has been found and information representing a position where the obstacle has been found, the obstacle information reception unit 351 provides the obstacle with a new ID, and associates the provided ID with position information representing the position having been received and stores into the obstacle information 341. At this time, the obstacle information reception unit 351 sets the number of detours to 0. The ID may be provided by the AGV 200. Alternatively, the obstacle information reception unit 351 may be configured to receive information representing a position where an obstacle has been found via the wireless communication part 330.

The route calculation unit 352 calculates a movement route for moving the AGV 200 to a predetermined position when there is a need to move the AGV 200, such as at the time of moving the AGV 200 from an AGV standby area or when the AGV 200 finds an obstacle and stops. For example, the route calculation unit 352 calculates a movement route passing through a necessary halfway point such as a cargo standby area or the position of a picking target in a picking area, from a start position such as an AGV standby area or a position where an obstacle has been found to a goal position such as a shipping berth.

Calculation of a movement route by the route calculation unit 352 is repeatedly performed until a movement route on which no obstacle is recognized by the obstacle check unit 353 to be described later is calculated. For example, the route calculation unit 352 calculates a movement route which is the shortest in a state without consideration of the existence of an obstacle. The obstacle check unit 353 checks whether or not an obstacle exists on the calculated route. In a case where the obstacle check unit 353 recognizes the existence of an obstacle, the route calculation unit 352 calculates a movement route in consideration of the obstacle recognized by the obstacle check unit 353. That is to say, the route calculation unit 352 calculates a movement route so as to avoid an obstacle recognized by the obstacle check unit 353. The route calculation unit 352 repeats the movement route calculation process as described above until a movement route on which the obstacle check unit 353 recognizes no obstacle is calculated.

An example of the movement route calculation process executed by the route calculation unit 352 will be described referring to FIGS. 9 to 20. FIGS. 9 to 19 show an example of the movement route calculation process. FIG. 20 shows an example of a movement route which is the shortest and a movement route in consideration of an obstacle.

In this example embodiment, the movement route calculation by the route calculation unit 352 is executed by repeating, from the start to the goal, calculation of a score obtained by adding an actual cost that is the cost of movement from the start and an estimated cost that is the cost of movement to the goal. When there is a need to pass through a halfway point, the above process is repeated so as to pass through the halfway point. For example, FIGS. 9 to 19 illustrate a case in which a movement route from a start position of a node (1, 1) to a goal position of a node (4, 3) is calculated.

Figure 9:
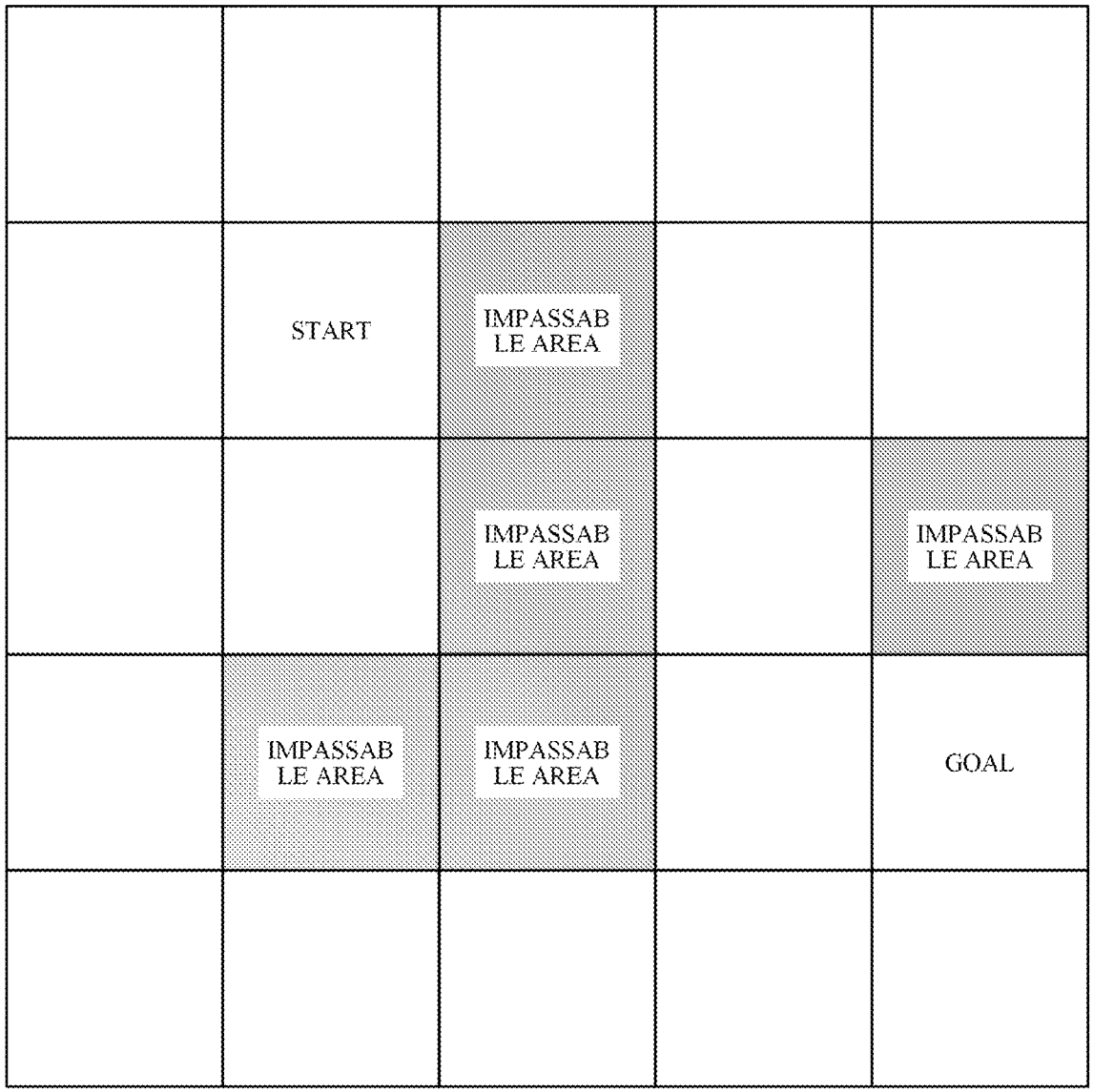
FIG. 9 is a view for describing an example of a process that a route calculation unit shown in FIG. 7 calculates a movement route.

Referring to FIG. 9, the route calculation unit 352 calculates the cost of the node (1, 1) that is the start position. In FIG. 9, there are 2 cells vertically and 3 cells horizontally from the start to the goal. Therefore, the route calculation unit 352 calculates an estimated cost "5" by 2+3. Thus, the route calculation unit 352 calculates an estimated cost according to the degree of separation from the goal without considering an impassable area. Moreover, the route calculation unit 352 calculates an actual cost "0" because there is no movement from the start. Then, the route calculation unit 352 calculates a score "5" by adding the actual cost "0" and the estimated cost "5".

Figure 10:
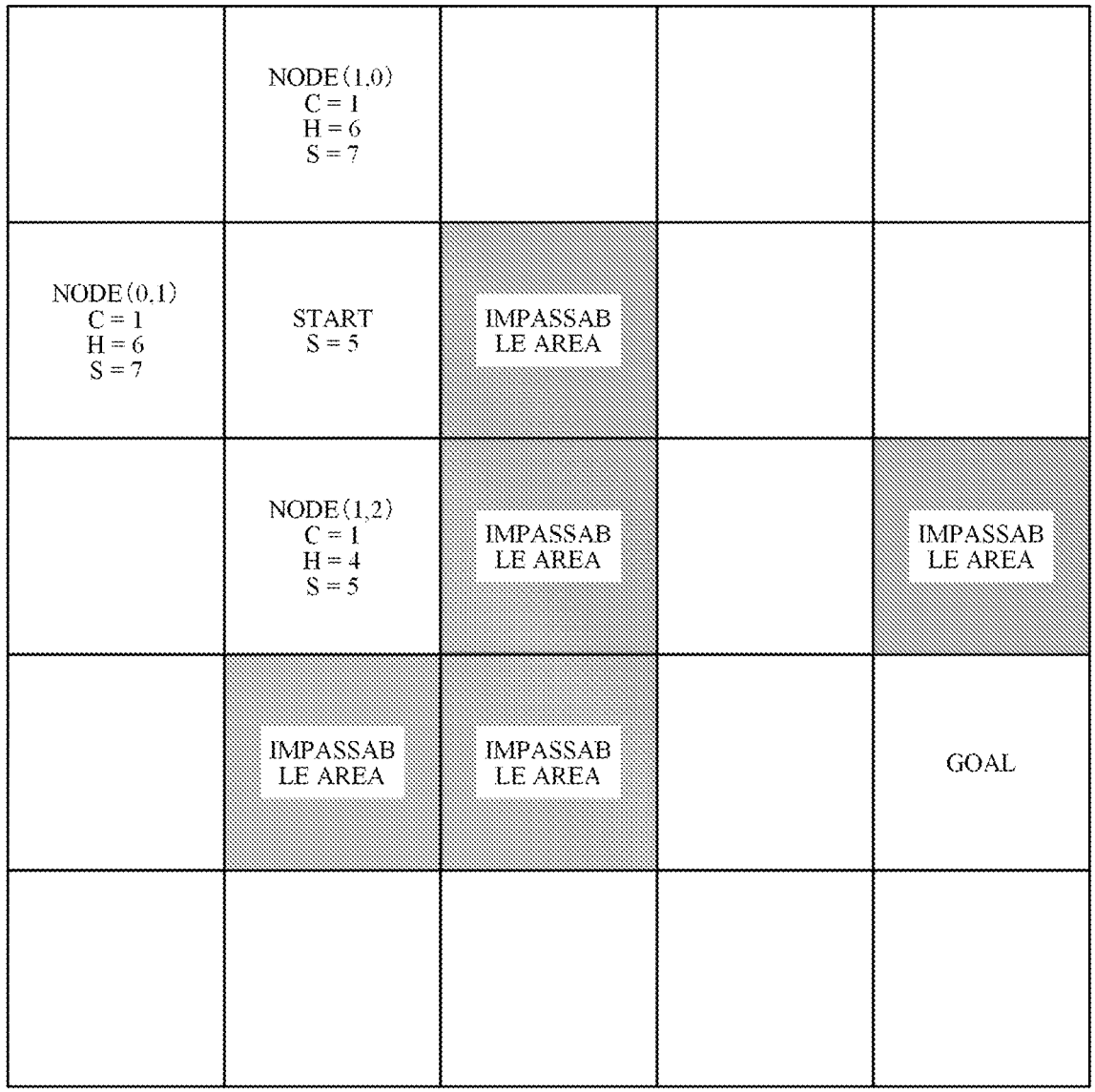
FIG. 10 is a view for describing the example of the process that the route calculation unit shown in FIG. 7 calculates a movement route.

Further, referring to FIG. 10, the route calculation unit 352 calculates the score of each node adjacent to the node (1, 1) serving as the reference. In FIG. 10, the route calculation unit 352 calculates a score "7" by actual cost "1"+ estimated cost "6" as the cost of a node (1, 0). Likewise, the route calculation unit 352 calculates a score "7" by actual cost "1"+ estimated cost "6" as the cost of a node (0, 1), and calculates a score "5" by actual cost "1"+ estimated cost "4" as the cost of a node (1, 2). Moreover, the route calculation unit 352 generates a link to the reference node (1, 1) of each node whose score has been calculated. That is to say, the route calculation unit 352 generates a link between each node whose score has been calculated and the node at the start position.

Figure 11:
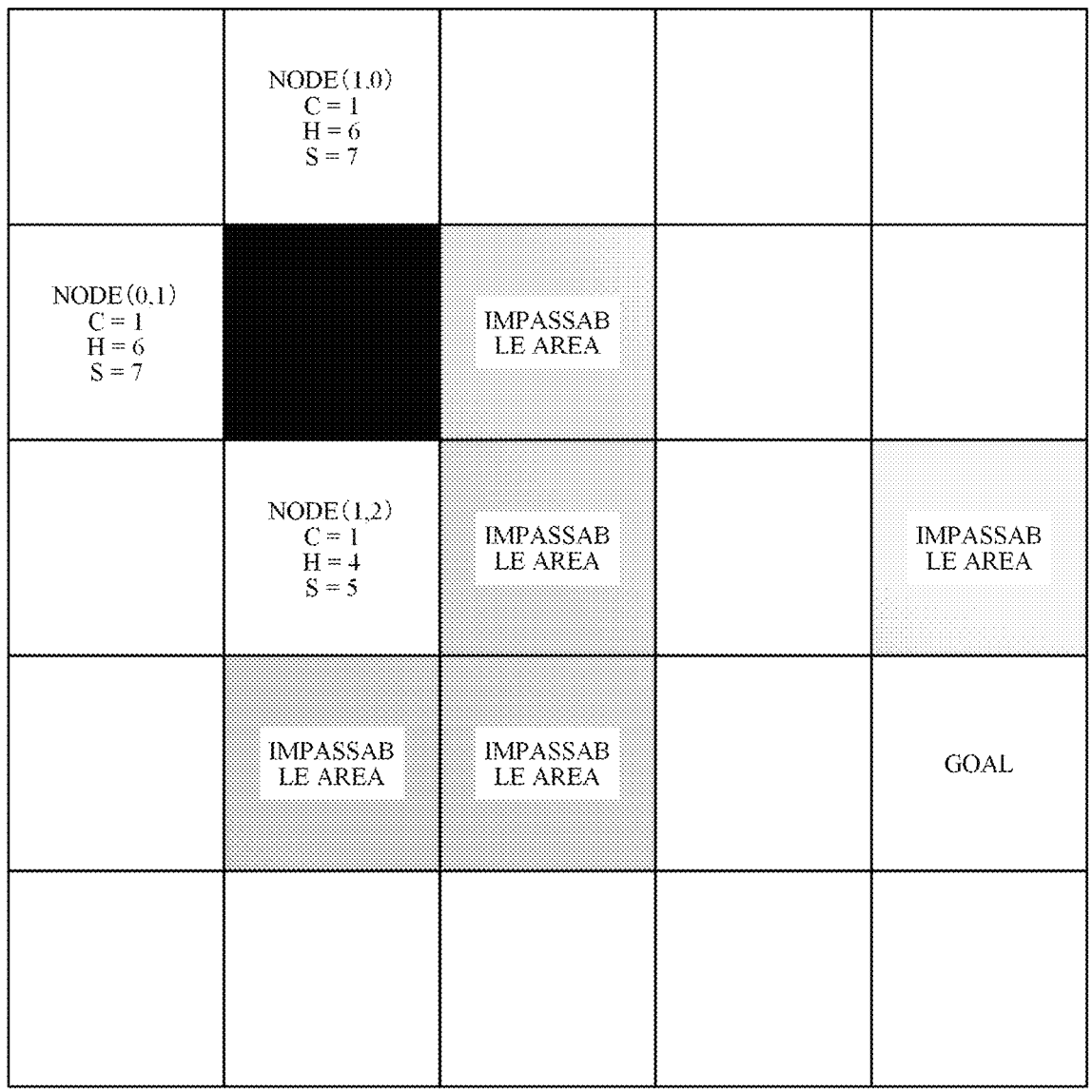
FIG. 11 is a view for describing the example of the process that the route calculation unit shown in FIG. 7 calculates a movement route.

Referring to FIG. 11, after calculating the score of each node adjacent to the reference node (1, 1), the route calculation unit 352 closes the reference node (1, 1). The closed node is excluded from the target of subsequent score calculation.

Figure 12:
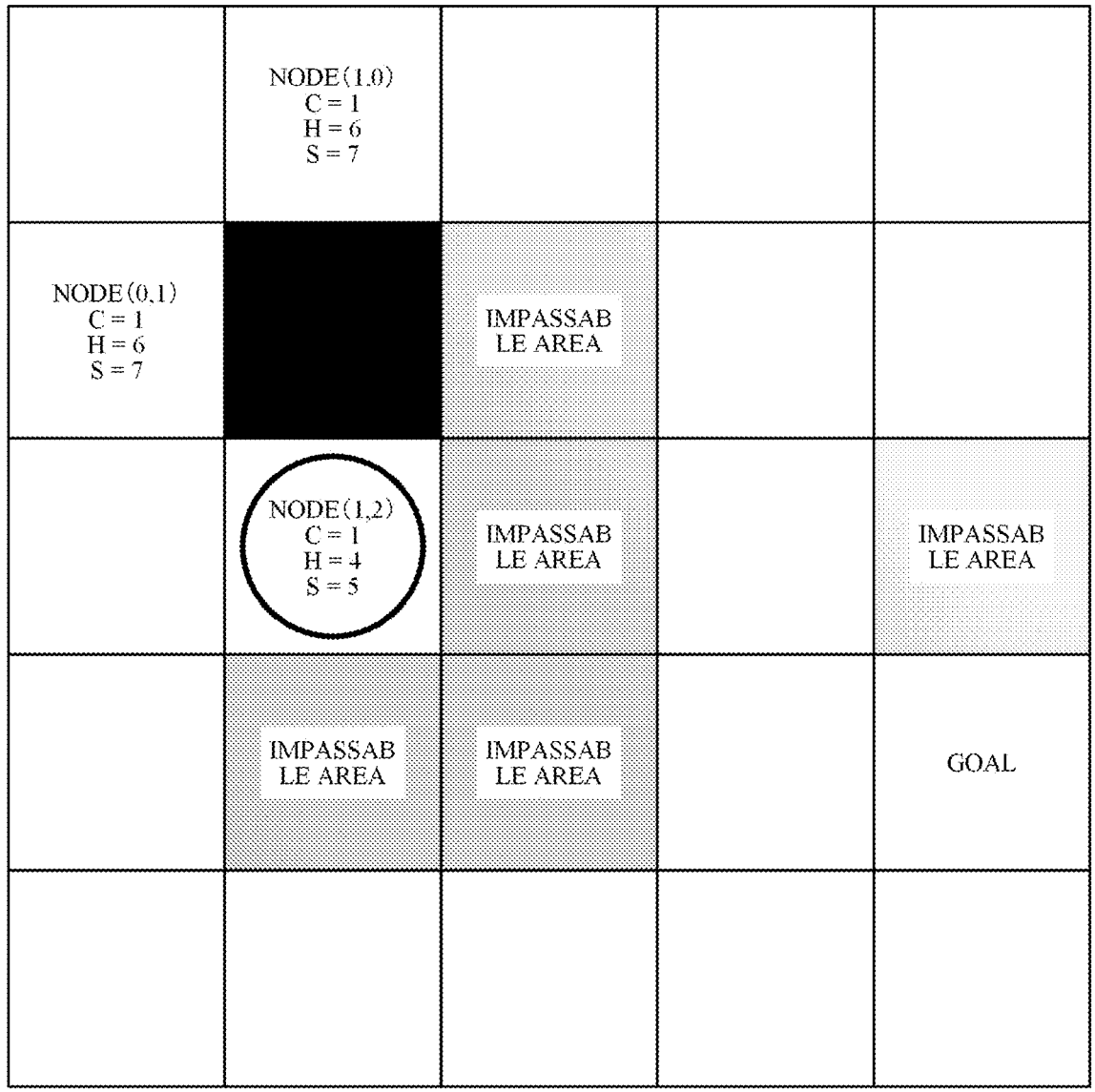
FIG. 12 is a view for describing the example of the process that the route calculation unit shown in FIG. 7 calculates a movement route.

Referring to FIG. 12, after closing the reference node (1, 1), the route calculation unit 352 selects a node serving as the reference next. For example, the route calculation unit 352 selects a node with the smallest score as the next reference node. In FIG. 12, the score of a node (1, 2) is the smallest of the calculated scores. Therefore, the route calculation unit 352 selects the node (1, 2) as the next reference node.

Figure 13:
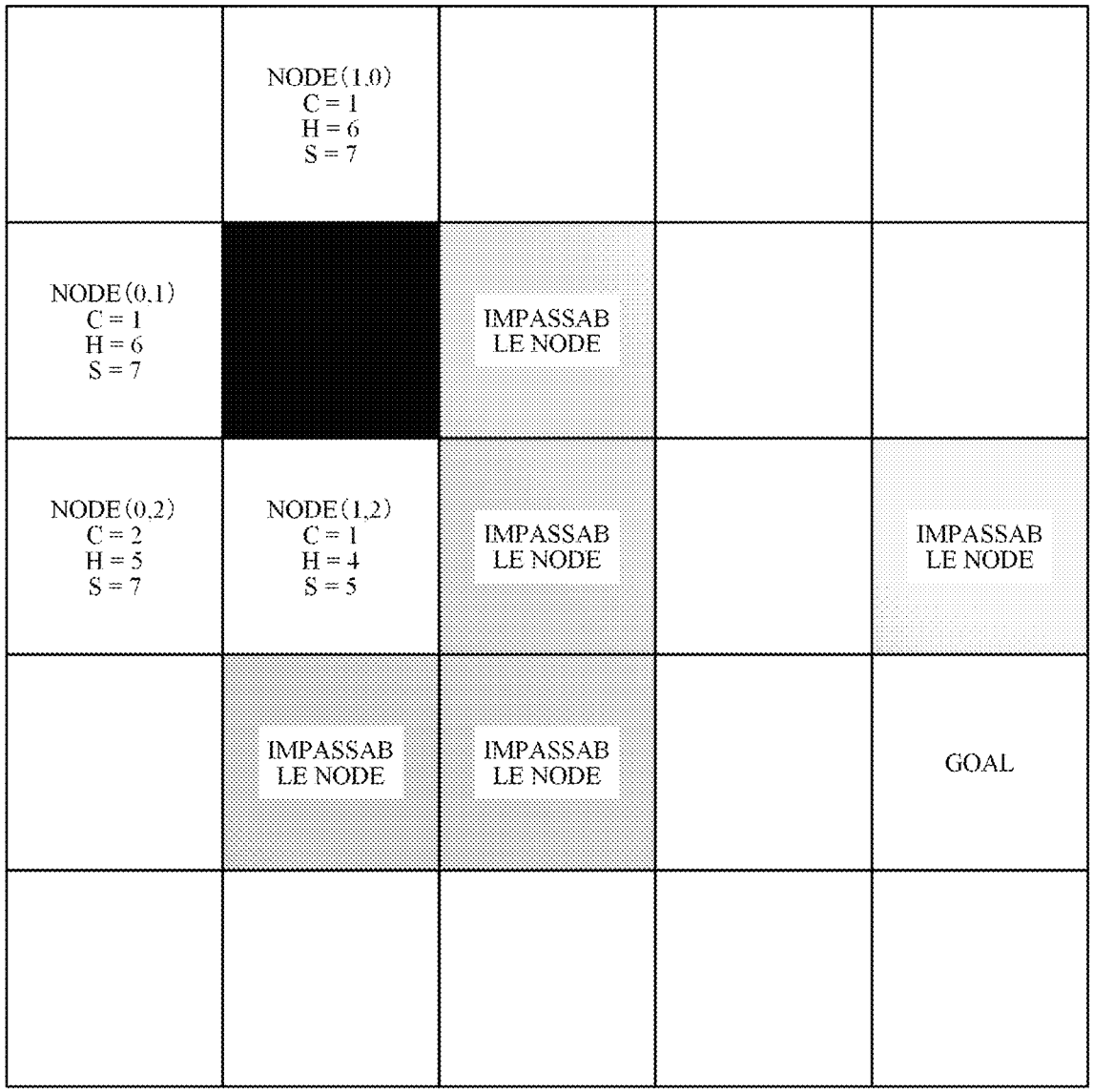
FIG. 13 is a view for describing the example of the process that the route calculation unit shown in FIG. 7 calculates a movement route.

Referring to FIG. 13, after selecting the reference node (1, 2), the route calculation unit 352 calculates the score of a node adjacent to the reference node (1, 2). In FIG. 13, the route calculation unit 352 calculates a score "7" by actual cost "2"+ estimated cost "5" as the cost of a node (0, 2). Moreover, the route calculation unit 352 generates a link of the node whose score has been calculated to the reference node (1, 2). The route calculation unit 352 does not calculate the score of an already closed node or the score of a node in the impassable area.

Figure 14:
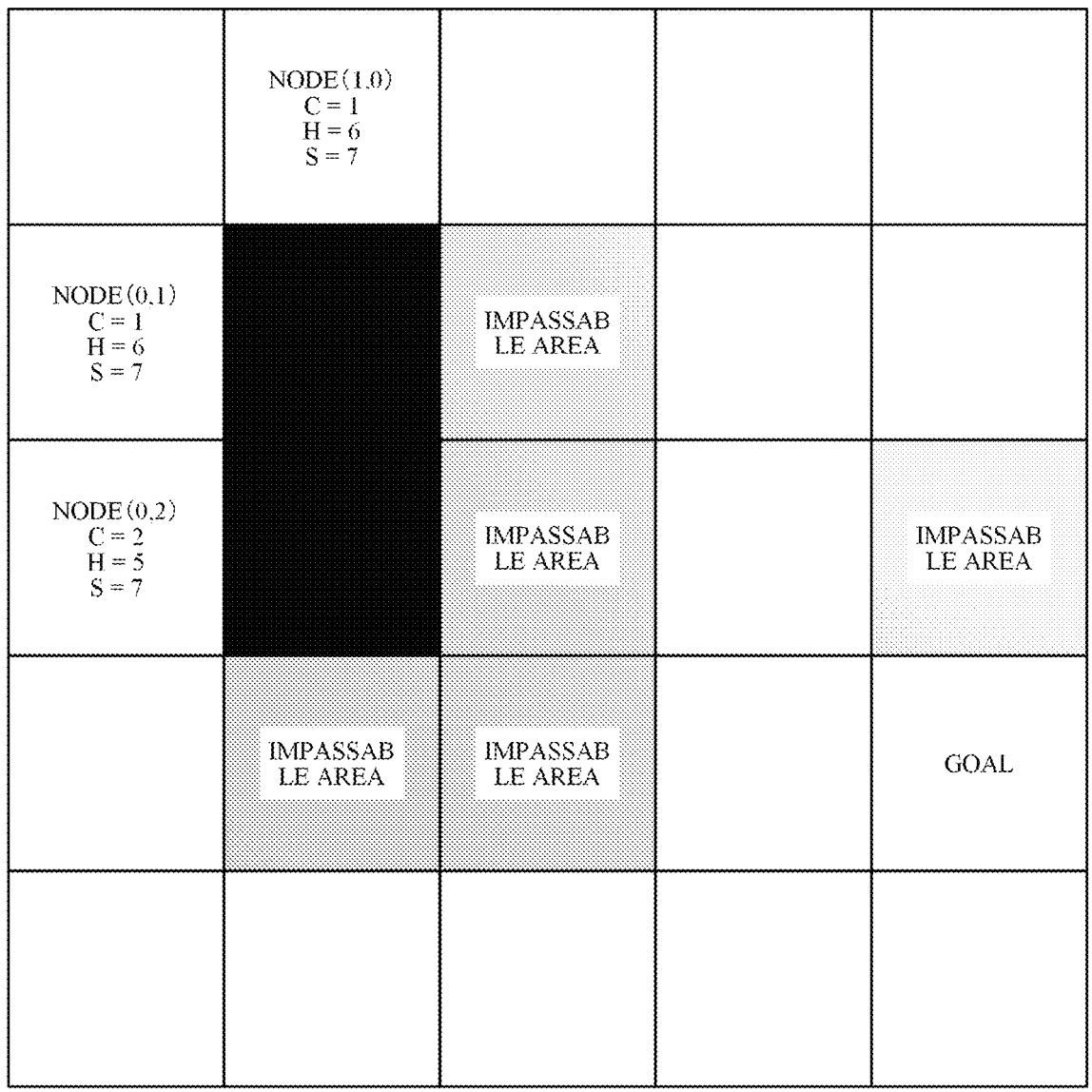
FIG. 14 is a view for describing the example of the process that the route calculation unit shown in FIG. 7 calculates a movement route.

Referring to FIG. 14, after calculating the score of the node (0, 2) adjacent to the reference node (1, 2), the route calculation unit 352 closes the reference node (1, 2).

Figure 15:
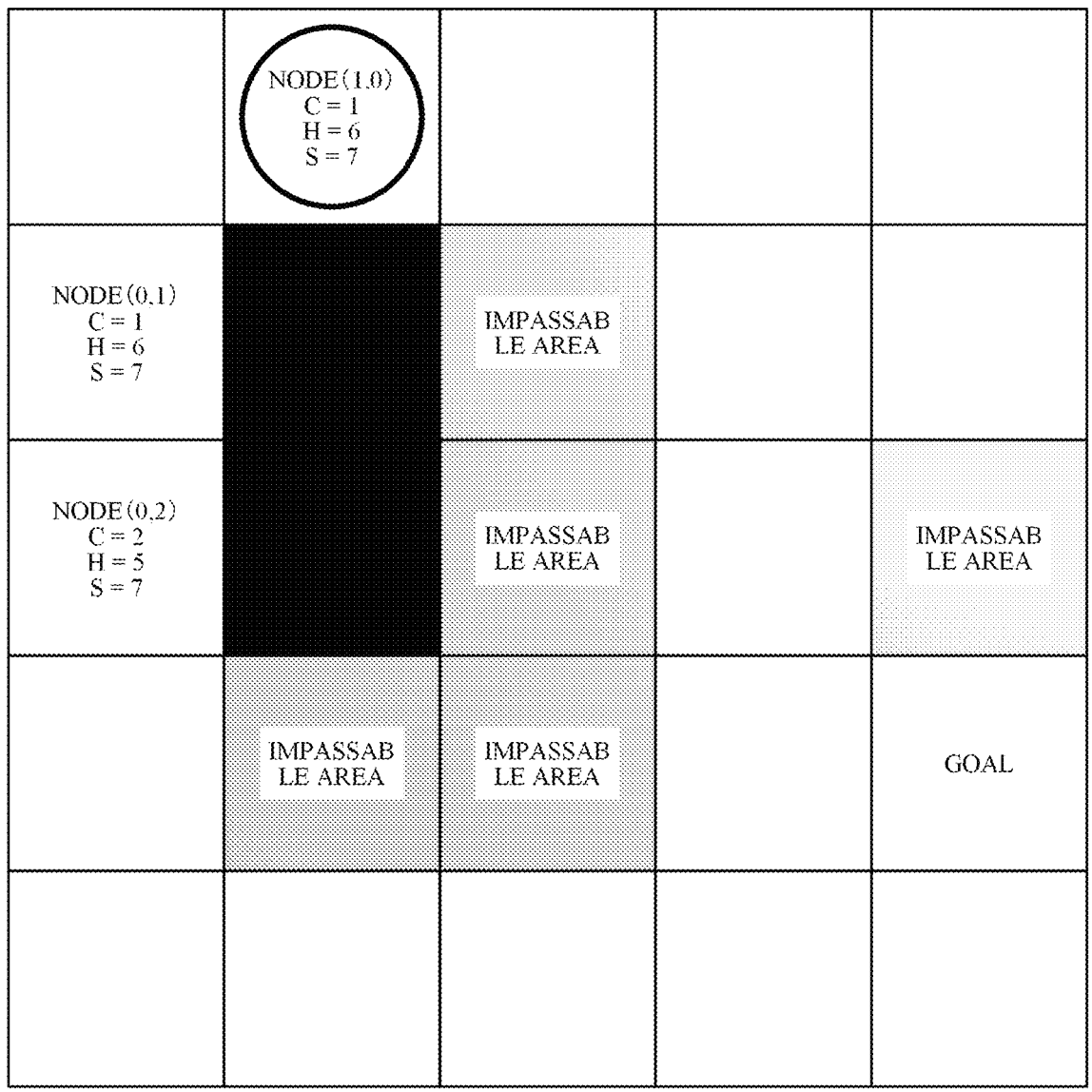
FIG. 15 is a view for describing the example of the process that the route calculation unit shown in FIG. 7 calculates a movement route.

Referring to FIG. 15, after closing the reference node (1, 2), the route calculation unit 352 selects a node serving as the reference next. For example, the route calculation unit 352 selects a node with the smallest score the next reference node. In FIG. 15, the score of the node (0, 1), the score of the node (0, 2), and the score of the node (1, 0) are equally 7. When there are multiple nodes whose scores are the smallest of the calculated scores as mentioned above, the route calculation unit 352 selects any node from among the nodes with the smallest scores. For example, in FIG. 15, the route calculation unit 352 selects the node (1, 0) as the reference node. In this example embodiment, a selection method for selecting a reference node from among nodes with the smallest scores is not particularly limited.

Figure 16:
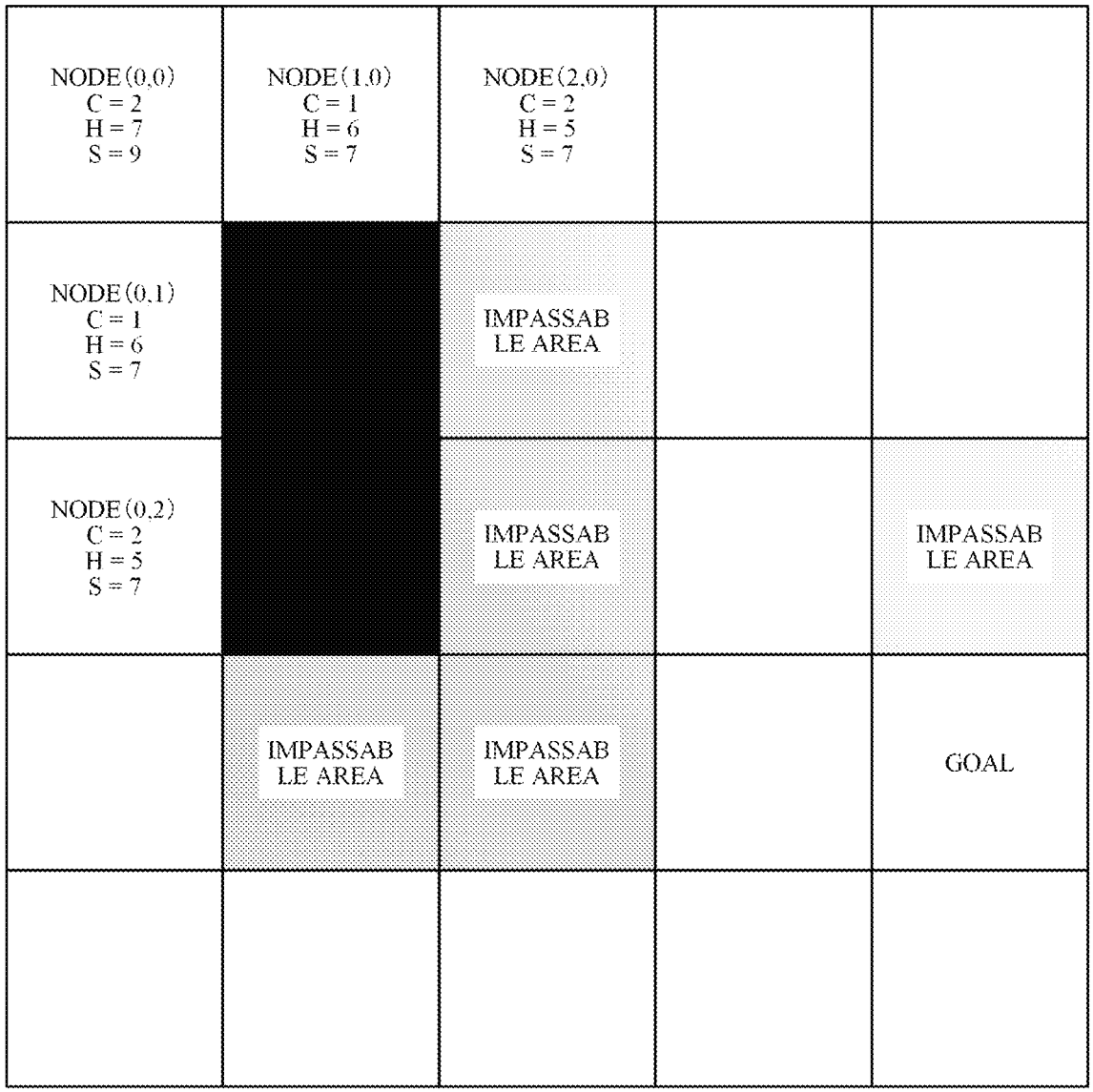
FIG. 16 is a view for describing the example of the process that the route calculation unit shown in FIG. 7 calculates a movement route.

Referring to FIG. 16, after selecting the reference node (1, 0), the route calculation unit 352 calculates the score of each node adjacent to the reference node (1, 0). In FIG. 16, the route calculation unit 352 calculates a score "9" by actual cost "2"+ estimated cost "7" as the cost of a node (0, 0). Likewise, the route calculation unit 352 calculates a score "7" by actual cost "2"+ estimated cost "5" as the cost of a node (2, 0). Moreover, the route calculation unit 352 generates a link of each node whose score has been calculated to the reference node (1, 0).

Figure 17:
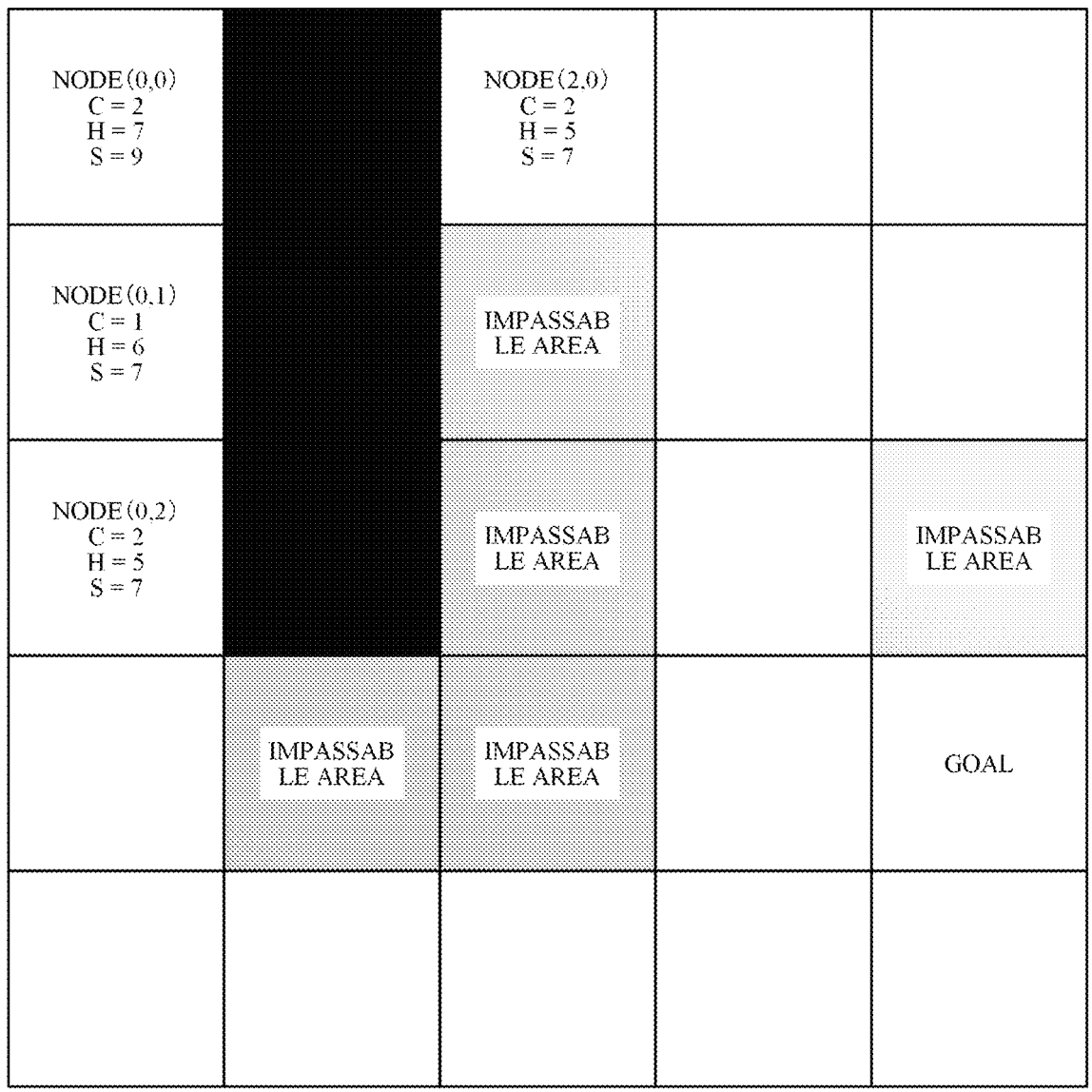
FIG. 17 is a view for describing the example of the process that the route calculation unit shown in FIG. 7 calculates a movement route.

Referring to FIG. 17, after calculating the score of each node adjacent to the reference node (1, 0), the route calculation unit 352 closes the reference node (1, 0).

Figure 18:
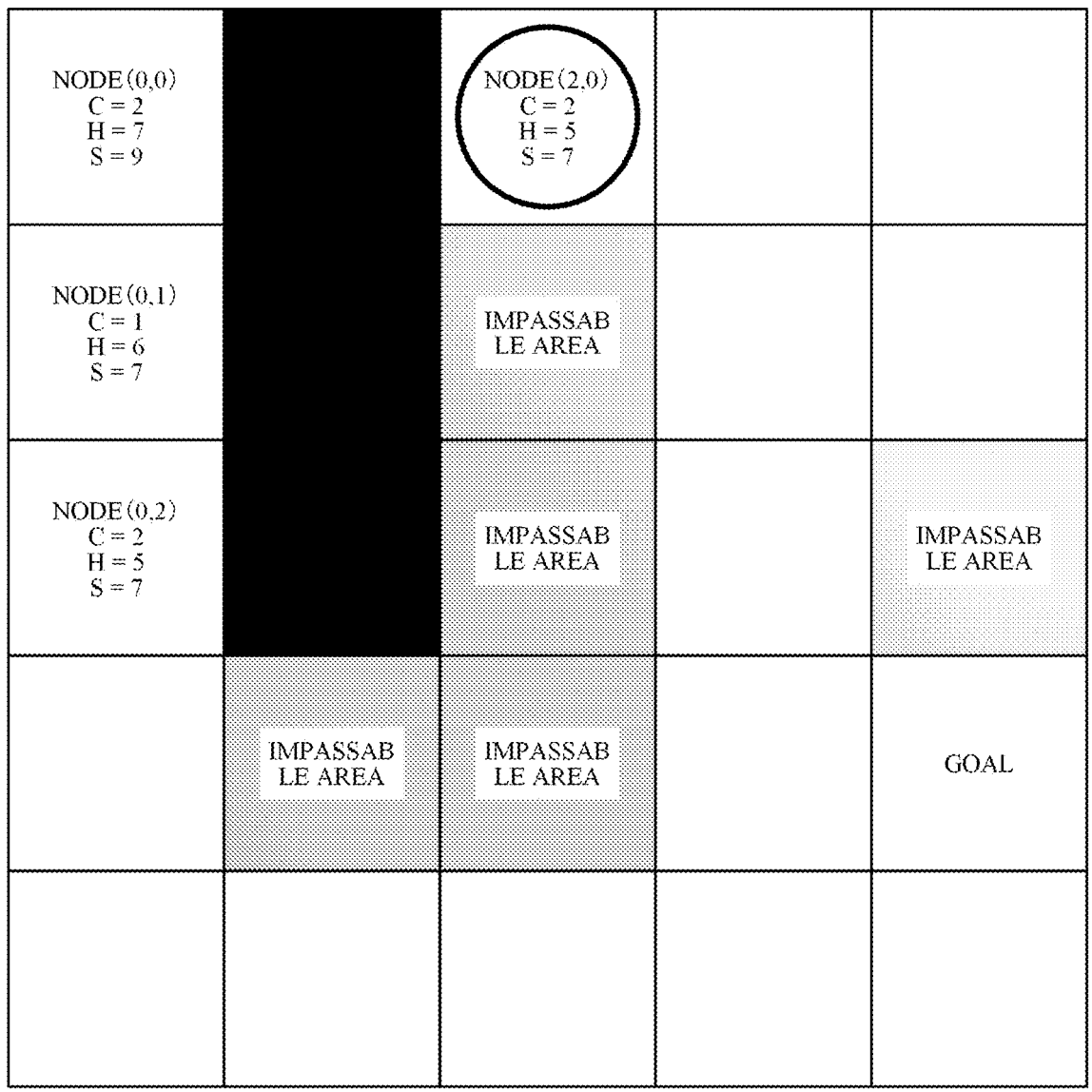
FIG. 18 is a view for describing the example of the process that the route calculation unit shown in FIG. 7 calculates a movement route.

Referring to FIG. 18, after closing the reference node (1, 0), the route calculation unit 352 selects a node serving as the reference next. For example, the route calculation unit 352 selects a node with the smallest score as the next reference node. In FIG. 18, the score of the node (2, 0), the score of the node (0, 1), and the score of the node (0, 2) are equally 7. When there are multiple nodes whose scores are the smallest of the calculated scores as mentioned above, the route calculation unit 352 selects any node of the nodes having the smallest scores. For example, in FIG. 18, the route calculation unit 352 selects the node (2, 0) as the reference node.

The route calculation unit 352 repeatedly executes the process as described referring to FIGS. 9 to 18 until reaching the node (4, 3) serving as the goal. When reaching the goal, the route calculation unit 352 completes a movement route from the start to the goal by tracking back the generated links up to the start. For example, as shown in FIG. 19, a movement route to move in order of the start node (1, 1), the node (1, 0), the node (2, 0), the node (3, 0), the node (3, 1), the node (3, 2), the node (3, 3), and the goal node (4, 3) is completed.

The route calculation unit 352 repeats the movement route calculation by the method as described above until the obstacle check unit 353 recognize no obstacle on a movement route. That is to say, as shown in FIG. 20, the route calculation unit 352 firstly calculates a movement route that is the shortest in a state without considering the existence of an obstacle ("original shortest route" in FIG. 20). However, as shown in FIG. 20, there is an obstacle with ID="1" on the shortest route. Therefore, in accordance with recognition of the obstacle by the obstacle check unit 353, the route calculation unit 352 calculates a movement route again ("route calculated to avoid" in FIG. 20). Because there is no obstacle on the movement route calculated again, the "route calculated to avoid" in FIG. 20 becomes a final movement route. Thus, the route calculation unit 352 performs route calculation multiple times as needed.

The obstacle check unit 353 checks whether or not there is an obstacle on a movement route calculated by the route calculation unit 352, and also functions as a counting unit that counts the number of detours indicating the magnitude of an influence of an obstacle on the movement route calculation. For example, when the route calculation unit 352 calculates a movement route, the obstacle check unit 353 receives information representing the movement route calculated by the route calculation unit 352, and also refers to the obstacle information 341. Then, the obstacle check unit 353 checks whether or not there is an obstacle on the movement route calculated by the route calculation unit 352 based on the position information in the obstacle information 341.

For example, in a case where it is determined from the position information in the obstacle information 341 that the movement route calculated by the route calculation unit 352 passes a position where there is an obstacle, the obstacle check unit 353 recognizes the existence of the obstacle on the movement route. Then, the obstacle check unit 353 increases by 1 the value of the number of detours corresponding to the obstacle existing on the movement route. Moreover, the obstacle check unit 353 transmits information representing the position of the recognized obstacle to the route calculation unit 352, and instructs the route calculation unit 352 to calculate a movement route in consideration of the recognized obstacle.

On the other hand, in a case where it is determined from the position information in the obstacle information 341 that the movement route calculated by the route calculation unit 352 does not pass a position where an obstacle exists, the obstacle check unit 353 confirms the absence of an obstacle on the movement route. When the obstacle check unit 353 confirms the absence of an obstacle, the obstacle check unit 353 transmits information representing the movement route that the absence of an obstacle is confirmed to the AGV 200 via the wireless communication part 330.

The obstacle information display unit 354 displays information corresponding to the obstacle information 341 on the screen display part 320.

FIG. 21 shows an example of screen display by the obstacle information display unit 354. As shown in FIG. 21, the obstacle information display unit 354 displays information corresponding to the obstacle information 341 on a map showing an area where the AGV 200 operates, for example.

For example, as shown in FIG. 21, the obstacle information display unit 354 displays with a display mode corresponding to the number of detours in the obstacle information 341. To be specific, the obstacle information display unit 354 displays detour information representing the existence of an obstacle, in a position corresponding to the position information in the obstacle information 341. At this time, the obstacle information display unit 354 changes the size and color of the detour information displayed in accordance with the number of detours. For example, the obstacle information display unit 354 displays the detour information so that the display size thereof becomes larger as the number of detours becomes more. For example, in FIG. 21, detour information 1 is displayed so as to be larger than detour information 2. This indicates that the number of detours corresponding to the detour information 1 is more than the number of detours corresponding to the deter information 2. Alternatively, the obstacle information display unit 354 changes the color of detour information to be displayed in accordance with the number of detours. What color is used in accordance with the number of detours may be set in any manner. Thus, the obstacle information display unit 354 displays with a display node in different size and color in accordance with the number of detours in the obstacle information 341.

Further, the obstacle information display unit 354 can not only display an obstacle in a position represented by the position information in the obstacle information 341, but also display to emphasize by surrounding the obstacle with circle, for example. The obstacle information display unit 354 can also change a display mode to emphasize display in accordance with the number of detours in the obstacle information 341. Moreover, by configuring to acquire information representing whether an obstacle is a stationary object or a moving object from the AGV 200, the obstacle information display unit 354 may be configured to differently display depending on whether an obstacle is a stationary object or a moving object.

Further, in a case where information that an object is being removed is received from a worker or the like, the obstacle information display unit 354 can display the information on the screen display part 320. Thus, the obstacle information display unit 354 may be configured to display in accordance with the status of an obstacle.

The above is an example of the configuration of the control system 100. Next, an example of the operation of the control system 100 will be described referring to FIGS. 22 and 23. First, an example of a process executed when the AGV 200 has found an obstacle will be described referring to FIG. 22.

FIG. 22 is a sequence diagram showing an example of a process when the AGV 200 has found an obstacle. Referring to FIG. 22, the obstacle finding unit 220 of the AGV 200 finds an obstacle while moving along a movement route (step S101). Then, the obstacle information transmission unit 210 of the AGV 200 transmits a fact that an obstacle has been found and information representing a position where the obstacle has been found to the AGV control device 300 by wireless communication (step S102).

The obstacle information reception unit 351 of the AGV control device 300 receives a fact that an obstacle has been found and information representing a position where the obstacle has been found via the wireless communication part 330.

Upon receiving the information representing a fact that an obstacle has been found and a position where the obstacle has been found, the obstacle information reception unit 351 provides the obstacle with a new identifier, namely, ID (step S201). Then, the obstacle information reception unit 351 associates the provided ID with position information representing the position having been received, and stores into the obstacle information 341 (step S202). At this time, the number of detours is set to 0.

The above is an example of the process when the AGV 200 has found an obstacle. Next, an example of a process when the AGV control device 300 calculates a movement route will be described referring to FIG. 23.

FIG. 23 shows an example of a process when calculating a movement route. Referring to FIG. 23, the route calculation unit 352 calculates a movement route that is the shortest in a state without considering the existence of an obstacle (step S301).

The obstacle check unit 353 checks whether or not an obstacle exists on the movement route calculated by the route calculation unit 352, based on the obstacle information 341 (step S302). In a case where the obstacle check unit 353 recognizes the existence of an obstacle (step S303, Yes), the obstacle check unit 353 increases by 1 the value of the number of detours corresponding to the obstacle existing on the movement route (step S304). Moreover, the obstacle check unit 353 transmits information representing the position of the recognized obstacle to the route calculation unit 352, and instructs the route calculation unit 352 to calculate a movement route in consideration of the recognized obstacle. Thus, the route calculation unit 352 calculates a movement route again in consideration of the obstacle recognized by the obstacle check unit 353 (step S305).

On the other hand, in a case where the obstacle check unit 353 does not recognize the existence of an obstacle (step S303, No), the obstacle check unit 353 transmits information representing the movement route on which absence of an obstacle has been recognized to the AGV 200 via the wireless communication part 330 (step S306).

The above is an example of the process when the AGV control device 300 calculates a movement route.

As stated above, the AGV control device 300 includes the route calculation unit 352 and the obstacle check unit 353. With such a configuration, in a case where an obstacle is recognized on a movement route calculated by the route calculation unit 352, the obstacle check unit 353 can add 1 to the number of detours and also instruct the route calculation unit 352 to calculate a movement route again. Moreover, the route calculation unit 352 can calculate a movement route so as to avoid an obstacle. Whit this, it is possible to grasp an influence of an obstacle when calculating a movement route so as to avoid an obstacle. Moreover, because it is possible consequently to grasp the existence of an influential obstacle with accuracy, it is possible to, for example, preferentially eliminate an influential obstacle, and it is possible to increase transport throughput. Moreover, because it is possible to accurately eliminate an influential obstacle, it is possible to realize a system with high environmental resistance.

In this example embodiment, a case where the route calculation unit 352 calculates a movement route based on a score calculated from an actual cost and an estimated cost has been described. However, the route calculation unit 352 may be configured to calculate a movement route by a method other than the method described in this example embodiment. The method that the route calculation unit 352 calculates a movement route is not limited to that exemplified in this example embodiment.

Further, in this example embodiment, the obstacle check unit 353 is configured to, upon recognizing an obstacle, increase by 1 the number of detours corresponding to the obstacle. However, a value added to the number of detours may be other than 1. For example, it is possible to think that an obstacle existing on a movement route calculated firstly by the route calculation unit 352 has a greater influence than an obstacle existing on a movement route calculated second time or later. Therefore, the obstacle check unit 353 may be configured to adjust a value added to the number of detours corresponding to an obstacle in accordance with the number of times that the route calculation unit 352 calculates a movement route, for example, reduce a value added to the number of detours in accordance with the number of times that the route calculation unit 352 calculates a movement route. It is possible to configure so that the number of detours is reset, for example, every predetermined period. In other words, it is possible to configure, for example, to count the number of detours within a predetermined period (may be any period).

Further, the AGV control device 300 may be configured to calculate an estimated time that is estimated for the AGV 200 to move on a calculated movement route. For example, the AGV control device 300 can calculate an estimated time that is the shortest in a state without considering the existence of an obstacle and an estimated time on a movement route on which the obstacle check unit 353 does not recognize any obstacle (that is, a final movement route). An estimated time estimated by the AGV control device 300 can be displayed on the screen display part 320 by the obstacle information display unit 354. The obstacle information display unit 354 may be configured to change a display mode in accordance with an estimated time estimated by the AGV control device 300.

Further, the AGV control device 300 may be configured to transmit the obstacle information 341 to an external device such as a mobile terminal of a worker. In other words, for example, the AGV control device 300 can be configured to transmit the obstacle information 341 to an external device so as to display in accordance with the number of detours on the screen display part of the external device. Meanwhile, it is also possible to configure the external device to display with a display mode corresponding to the number of detours.

Further, the AGV control device 300 may be configured to determine to early remove an obstacle based on the number of detours. For example, the AGV control device 300 can be configured to, when the number of detours exceeds a predetermined threshold (may be any value), display the need to remove an obstacle on the screen display part 320 or a screen display part of an external device.

Second Example Embodiment

Figure 24:
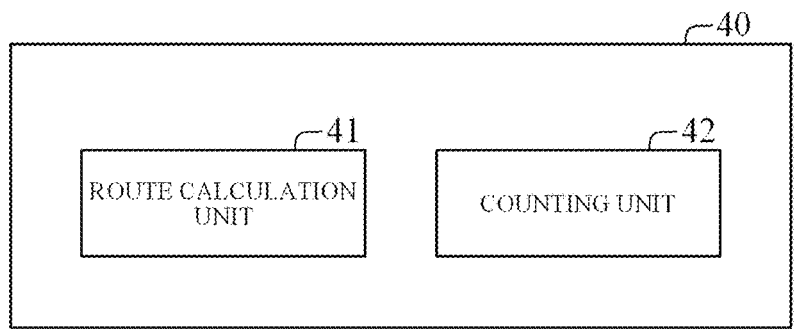
FIG. 24 is a block diagram showing an example of the configuration of a control device according to a second example embodiment of the present invention.

Next, referring to FIG. 24, a second example embodiment of the present invention will be described. In the second example embodiment, the configuration of a control device 40 will be described.

The control device 40 controls the movement route of a transportation vehicle. FIG. 24 shows an example of the configuration of the control device 40. Referring to FIG. 24, the control device 40 includes a route calculation unit 41 and a counting unit 42. For example, the control device 40 includes an arithmetic logic unit of a CPU or the like and a storage unit. For example, the control device 40 realizes the above processing units by execution of a program stored in the storage unit by the arithmetic logic unit.

The route calculation unit 41 calculates the movement route of a transportation vehicle up to a target position. When an obstacle exists on the movement route, the route calculation unit 41 calculates a movement route again so as to avoid the obstacle.

The counting unit 42 counts the number of detours indicating the magnitude of an influence of an obstacle on movement route calculation. For example, when an obstacle exists on a movement route, the counting unit 42 increases the number of detours by 1.

Thus, the control device 40 includes the route calculation unit 41 and the counting unit 42. With such a configuration, when an obstacle exists on a movement route calculated by the route calculation unit 41, the counting unit 42 can count the number of detours corresponding to the obstacle confirmed to exist. Moreover, the route calculation unit 41 can calculate a movement route again so as to avoid the obstacle. By thus counting the number of detours corresponding to an obstacle, it is possible to grasp an influence of an obstacle when calculating a movement route so as to avoid the obstacle. Moreover, because it is possible consequently to grasp the existence of an influential obstacle with accuracy, it is possible to, for example, preferentially eliminate the influential obstacle, and it is possible to increase transport throughput. Moreover, because it is possible to accurately eliminate an influential obstacle, it is increase environmental resistance.

Further, the control device 40 described above is realized by installation of a predetermined program in the control device 40. To be specific, a program according to another aspect of the present invention is a program that causes the control device 40 controlling the movement route of a transportation vehicle to realize the route calculation unit 41 calculating the movement route of a transportation vehicle up to a target device. In a case where an obstacle exists on the calculated movement route, the counting unit counts the number of detours indicating the magnitude of an influence of the obstacle on movement route calculation, and the route calculation unit 41 calculates a movement route again so as to avoid the obstacle.

Further, a control method executed by the control device 40 described above is a method in which the control device 40 controlling the movement route of a transportation vehicle calculates the movement route of a transportation vehicle up to a target device and, in a case where an obstacle exists on the calculated movement route, the control device 40 counts the number of detours indicating the magnitude of an influence of the obstacle on movement route calculation, and calculates a movement route again so as to avoid the obstacle.

Because the inventions of the program and the control method with the configurations described above have the same actions as the control device 40 described above, it is possible to achieve the object of the present invention.

<Supplementary Notes>

The whole or part of the example embodiments disclosed above can be described as the following supplementary notes. Below, the overview of a control method and so on according to the present invention will be described. However, the present invention is not limited to the following configurations.

(Supplementary Note 1)

A control method by a control device controlling a movement route of a transportation vehicle, the control method comprising:

calculating a movement route to a target position of the transportation vehicle; and in a case where an obstacle exists on the calculated movement route, counting a number of detours indicating magnitude of an influence of the obstacle on movement route calculation, and calculating the movement route again so as to avoid the obstacle.

(Supplementary Note 2)

The control method according to Supplementary Note 1, comprising:

acquiring obstacle information representing that the transportation vehicle has found an obstacle from the transportation vehicle; and based on a result of calculating the movement route and the obstacle information, checking whether or not the obstacle exists on the calculated route.

(Supplementary Note 3)

The control method according to Supplementary Note 2, comprising:

upon acquiring the obstacle information, associating an identifier of the obstacle indicated by the acquired obstacle information with a place where the obstacle has been found and storing into a storage device; and based on the result of calculating the movement route and information stored in the storage device, checking whether or not the obstacle exists on the calculated route.

(Supplementary Note 4)

The control method according to any one of Supplementary Notes 1 to 3, comprising:

calculating a movement route in a state without consideration of existence of an obstacle as the movement route to the target position of the transportation vehicle; and in a case where an obstacle exists on the calculated movement route, calculating the movement route again so as to avoid the recognized obstacle.

(Supplementary Note 5)

The control method according to Supplementary Note 4, comprising:

calculating a shortest route in a state without consideration of existence of an obstacle as the movement route to the target position of the transportation vehicle.

(Supplementary Note 6)

The control method according to any one of Supplementary Notes 1 to 5, comprising:

causing a screen display part included by the control device or included by an external device to show a display corresponding to the number of detours.

(Supplementary Note 7)

The control method according to Supplementary Note 6, comprising:

changing a display mode of the display in accordance with the number of detours.

(Supplementary Note 8)

The control method according to any one of Supplementary Notes 1 to 7, comprising:

in a case where any obstacle is not recognized on the calculated movement route, transmitting information representing the movement route on which any obstacle is not recognized to the transportation vehicle.

(Supplementary Note 9)

A control device controlling a movement route of a transportation vehicle, the control device comprising a route calculation unit configured to calculate a movement route to a target position of the transportation vehicle, wherein in a case where an obstacle exists on the calculated movement route, a counting unit counts a number of detours indicating magnitude of an influence of the obstacle on movement route calculation, and the route calculation unit calculates the movement route again so as to avoid the obstacle.

(Supplementary Note 10)

A non-transitory computer-readable medium storing a program comprising instructions for causing a control device controlling a movement route of a transportation vehicle to realize a route calculation unit configured to calculate a movement route to a target position of the transportation vehicle, wherein in a case where an obstacle exists on the calculated movement route, a counting unit counts a number of detours indicating magnitude of an influence of the obstacle on movement route calculation, and the route calculation unit calculates the movement route again so as to avoid the obstacle.

The program described in the above example embodiments and supplementary notes is stored in a storage device or recorded on a computer-readable recording medium. For example, the recording medium is a portable medium such as a flexible disk, an optical disk, a magneto-optical disk, or a semiconductor memory.

Although the present invention has been described above referring to the above example embodiments, the present invention is not limited to the example embodiments. The configurations and details of the present invention can be changed in various manners that can be understood by one skilled in the art within the scope of the present invention.

DESCRIPTION OF REFERENCE NUMERALS

100 control system
200 AGV
210 obstacle information transmission unit
220 obstacle finding unit
300 AGV control device
310 operation input part
320 screen display part
330 wireless communication part
340 storage part
341 obstacle information
342 program
350 arithmetic logic part
351 obstacle information reception unit
352 route calculation unit
353 obstacle check unit
354 obstacle information display unit
40 control device
41 route calculation unit
42 obstacle check unit

The invention claimed is:

1. A control method performed by a processor for controlling a movement route of a transportation vehicle, the control method comprising:

calculating a movement route to a target position of the transportation vehicle in a state without consideration of the existence of an obstacle;

when the existence of a previously found obstacle on the calculated movement route is recognized based on obstacle information including a position of the previously found obstacle, counting a number of detours indicating a magnitude of influence of the previously found obstacle, and calculating the movement route again so as to avoid the previously found obstacle;

repeating calculation of the movement route for each additional previously found obstacle based on the obstacle information until the movement route is calculated on which no previously found obstacle is recognized;

after having calculated the movement route on which no previously found obstacle is recognized, transmitting information representing the calculated movement route to the transportation vehicle for the transportation vehicle to move in accordance with the calculated movement route;

causing a screen display to show the one or more previously found obstacles and corresponding number of detours; and when the number of detours corresponding to any of the one or more previously found obstacles exceeds a predetermined threshold, causing the screen to display the need to remove the corresponding previously found obstacle.

2. The control method according to claim 1, further comprising:
acquiring the obstacle information representing that the transportation vehicle has previously found the obstacle from the transportation vehicle; and
based on a result of calculating the movement route and the obstacle information, checking whether or not the previously found obstacle exists on the calculated route.

3. The control method according to claim 2, further comprising:
upon acquiring the obstacle information, associating an identifier of the previously found obstacle indicated by the acquired obstacle information with a place where the previously found obstacle has been found; and
based on the result of calculating the movement route and association of the identifier with the place, checking whether or not the previously found obstacle exists on the calculated route.

4. The control method according to claim 1, wherein calculating the movement route includes calculating a shortest route in the state without consideration of the existence of the obstacle as the movement route to the target position of the transportation vehicle.

5. The control method according to claim 1, wherein the movement route is from a starting position to the target position, and wherein calculating the movement route again is performed before the transportation vehicle proceeds along the movement route from the starting position.

6. The control method according to claim 1, further comprising:
changing a display mode of the screen display in accordance with the number of detours.

7. A control device controlling a movement route of a transportation vehicle, the control device comprising:
a memory storing instructions; and
at least one processor executing the instructions to perform:
calculating a movement route to a target position of the transportation vehicle in a state without consideration of the existence of an obstacle;
when the existence of a previously found obstacle on the calculated movement route is recognized based on obstacle information including a position of a previously found obstacle, counting a number of detours indicating a magnitude of influence of the previously found obstacle, and calculating the movement route again so as to avoid the previously found obstacle;
repeating calculation of the movement route for each additional previously found obstacle based on the obstacle information until the movement route is calculated on which no previously found obstacle is recognized;
after having calculated the movement route on which no previously found obstacle is recognized, transmitting information representing the calculated movement route to the transportation vehicle for the transportation vehicle to move in accordance with the calculated movement route;
causing a screen display to show the one or more previously found obstacles and corresponding number of detours; and
when the number of detours corresponding to any of the one or more previously found obstacles exceeds a predetermined threshold, causing the screen to display the need to remove the corresponding previously found obstacle.

8. A non-transitory computer-readable medium storing a program comprising instructions executable by a processor for controlling a movement route of a transportation vehicle by:
calculating a movement route to a target position of the transportation vehicle in a state without consideration of the existence of an obstacle;
when the existence of a previously found obstacle on the calculated movement route is recognized based on obstacle information including a position of the previously found obstacle, counting a number of detours indicating a magnitude of influence of the previously found obstacle, and calculating the movement route again so as to avoid the previously found obstacle;
repeating calculation of the movement route for each additional previously found obstacle based on the obstacle information until the movement route is calculated on which no previously found obstacle is recognized;
after having calculated the movement route on which no previously found obstacle is recognized, transmitting information representing the calculated movement route to the transportation vehicle for the transportation vehicle to move in accordance with the calculated movement route;
causing a screen display to show the one or more previously found obstacles and corresponding number of detours; and
when the number of detours corresponding to any of the one or more previously found obstacles exceeds a predetermined threshold, causing the screen to display the need to remove the corresponding previously found obstacle.

* * * * *